(12) United States Patent
Topinka et al.

(10) Patent No.: US 11,187,955 B2
(45) Date of Patent: Nov. 30, 2021

(54) ELECTROCHROMIC DEVICES WITH PATTERNED ELECTRICALLY CONDUCTIVE LAYERS CONFIGURED TO MINIMIZE DIFFRACTION EFFECTS

(71) Applicant: Kinestral Technologies, Inc., Hayward, CA (US)

(72) Inventors: Mark Topinka, Hayward, CA (US); Scott Sharpe, Hayward, CA (US)

(73) Assignee: HALIO, INC., Hayward, CA (US)

( * ) Notice: Subject to any disclaimer, the term of this patent is extended or adjusted under 35 U.S.C. 154(b) by 275 days.

(21) Appl. No.: 16/410,551

(22) Filed: May 13, 2019

(65) Prior Publication Data

US 2019/0346731 A1    Nov. 14, 2019

Related U.S. Application Data

(60) Provisional application No. 62/670,061, filed on May 11, 2018.

(51) Int. Cl.
| | |
|---|---|
| *G02F 1/153* | (2006.01) |
| *G02F 1/03* | (2006.01) |
| *G02F 1/15* | (2019.01) |
| *G09G 3/19* | (2006.01) |
| *G02F 1/155* | (2006.01) |
| *B60J 3/04* | (2006.01) |
| *E06B 9/24* | (2006.01) |

(52) U.S. Cl.
CPC ............ *G02F 1/1533* (2013.01); *G02F 1/155* (2013.01); *B60J 3/04* (2013.01); *E06B 9/24* (2013.01); *E06B 2009/2464* (2013.01)

(58) Field of Classification Search
CPC ...... G02F 1/155; G02F 1/1523; G02F 1/1525; G02F 1/1521; G02F 1/1533; G02F 1/03; G02F 1/0316; G02F 3/16; G02F 1/163; C09K 9/02; B60R 1/088; H04N 9/3137; H04N 9/22
USPC ................ 359/265–275, 277, 245–247, 242; 345/49, 105, 107; 248/817; 438/929
See application file for complete search history.

(56) References Cited

U.S. PATENT DOCUMENTS 10,386,688 B1 *   8/2019   Sharpe .................... G02F 1/163

* cited by examiner

*Primary Examiner* — Dawayne Pinkney
(74) *Attorney, Agent, or Firm* — Womble Bond Dickinson (US) LLP

(57) ABSTRACT

An electrochromic device comprises a first transparent substrate and a first electrically conductive layer arranged on a surface of the first transparent substrate, wherein the first electrically conductive layer is patterned with curved scribed line segments. The curved scribed line segments comprise a longitudinal direction and a transverse direction, and the distance from each curved scribed line segment to a line along the longitudinal direction of each curved scribed line segment varies nonmonotonically as a function of position along the curved scribed line segment.

19 Claims, 17 Drawing Sheets

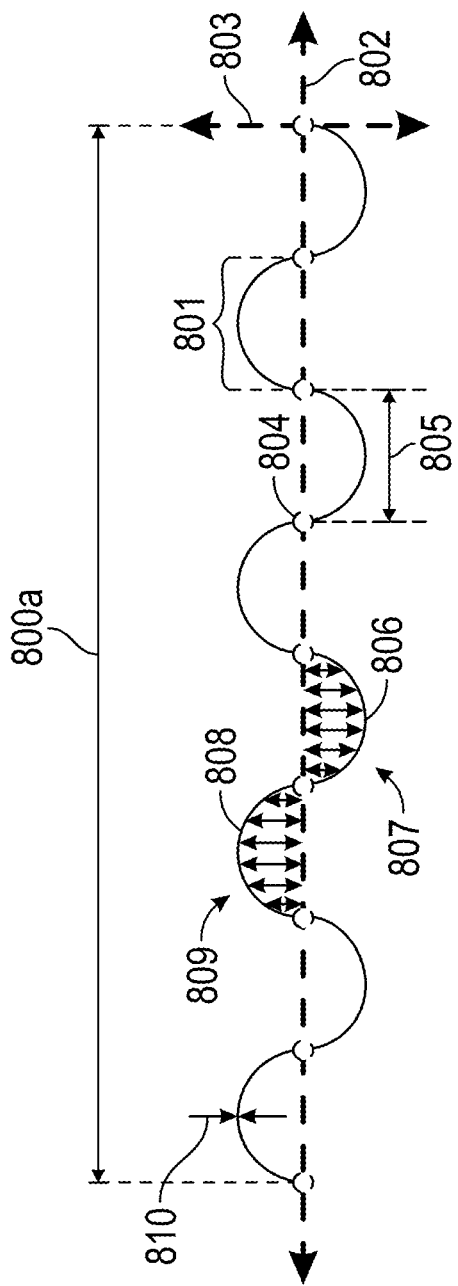
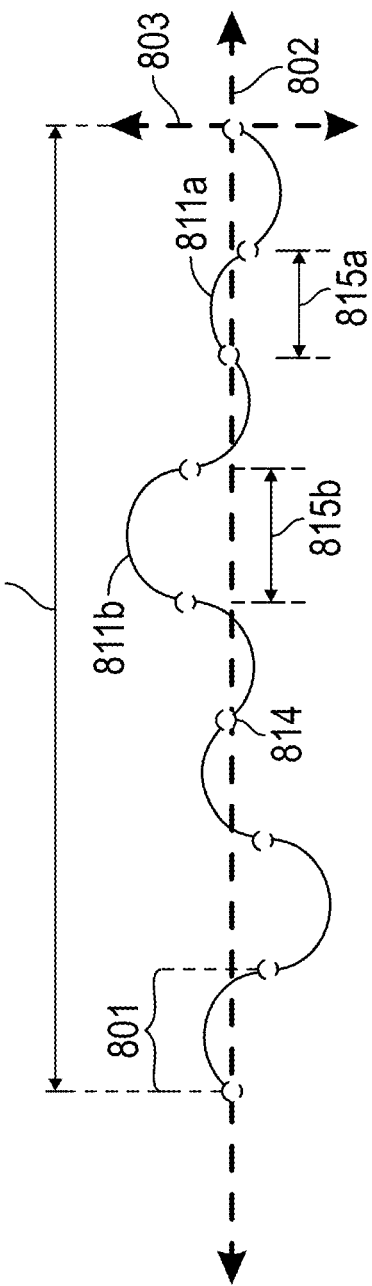
FIG. 8A
FIG. 8B

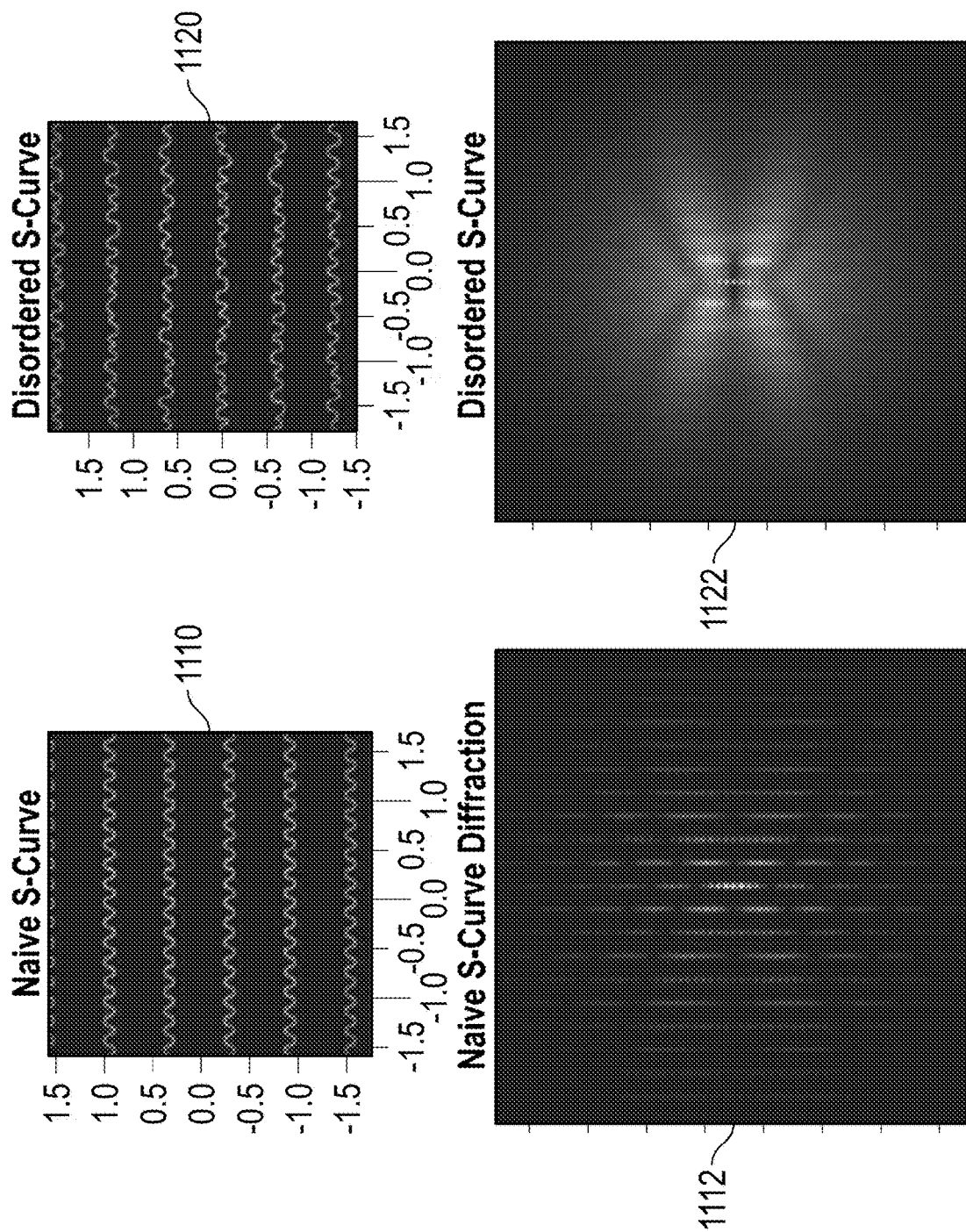

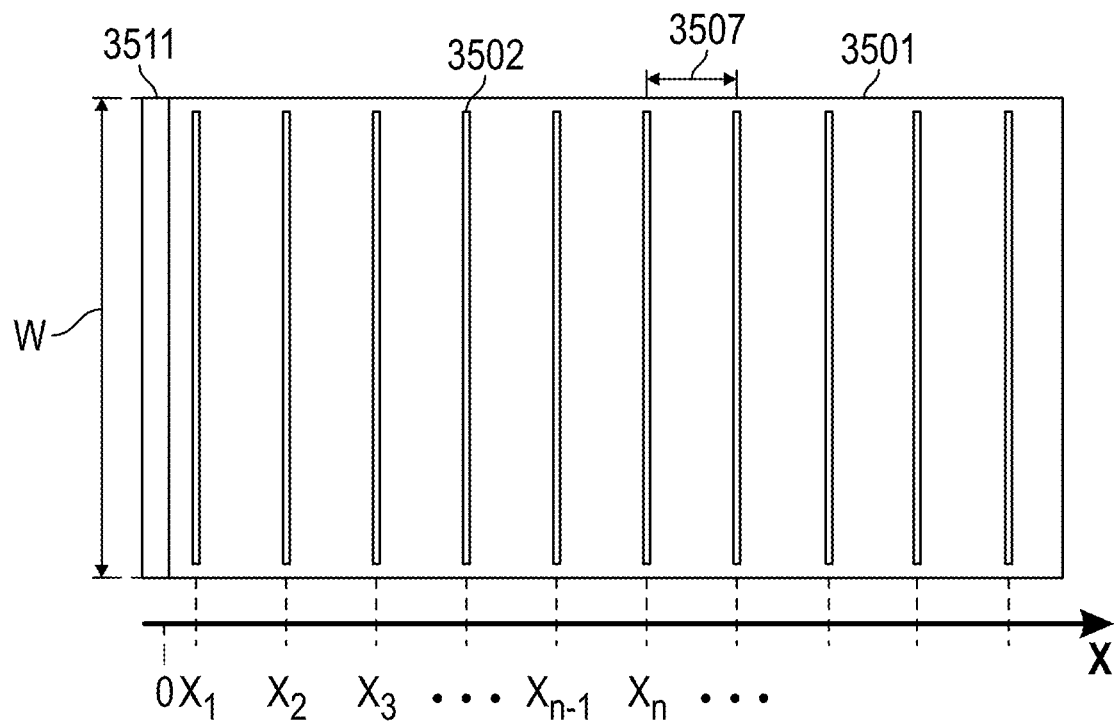
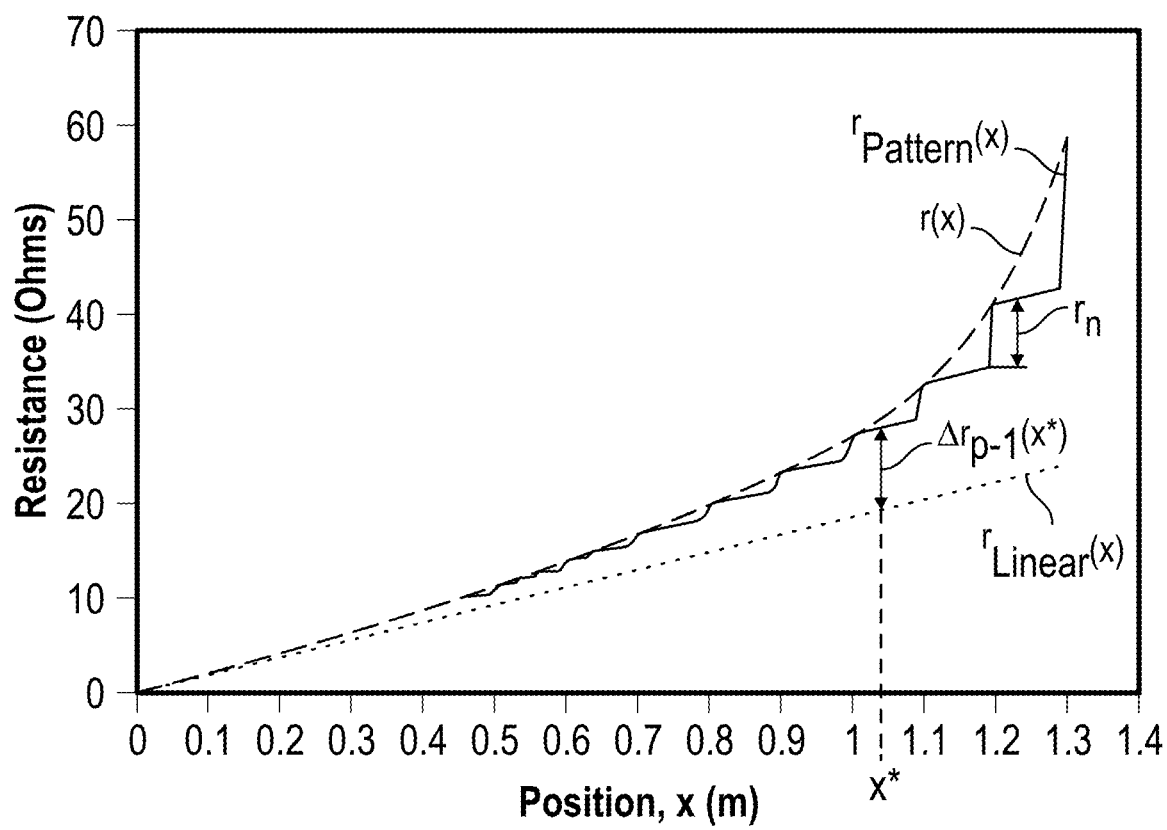
FIG. 14

ELECTROCHROMIC DEVICES WITH PATTERNED ELECTRICALLY CONDUCTIVE LAYERS CONFIGURED TO MINIMIZE DIFFRACTION EFFECTS

RELATED APPLICATIONS

This application claims priority to U.S. Provisional Application No. 62/670,061, filed on May 11, 2018 and entitled "ELECTROCHROMIC DEVICES WITH PATTERNED ELECTRICALLY CONDUCTIVE LAYERS CONFIGURED TO MINIMIZE DIFFRACTION EFFECTS", which is hereby incorporated by reference.

FIELD OF THE INVENTION

The present disclosure generally relates to an electrochromic device, such as an architectural or vehicular window, configured to cycle between more transmissive and less transmissive states and including an electrically conductive layer with a scribed pattern to minimize diffraction effects of the laser scribed areas. The methods of determining and making the scribed pattern are also described. In one particular method the scribed pattern is formed using a laser.

BACKGROUND

Commercial switchable glazing devices are well known for use as mirrors in motor vehicles, automotive windows, aircraft window assemblies, sunroofs, skylights, and architectural windows. Such devices may comprise, for example, inorganic electrochromic devices, organic electrochromic devices, switchable mirrors, and hybrids of these having two conducting layers with one or more active layers between the conducting layers. When a voltage is applied across these conducting layers the optical properties of a layer or layers in between change. Such optical property changes are typically a modulation of the transmissivity of the visible or the solar wavelength range of the electromagnetic spectrum. For convenience, the two optical states will be referred to as a lightened state and a darkened state in the following discussion, but it should be understood that these are merely examples and relative terms (i.e., one of the two states is "lighter" or more transmissive than the other state) and that there could be a set of lightened and darkened states between the extremes that are attainable for a specific electrochromic device; for example, it is feasible to switch between intermediate lightened and darkened states in such a set.

Switching between a lightened and a darkened state in relatively small electrochromic devices such as an electrochromic rear-view mirror assembly is typically quick and uniform, whereas switching between the lightened and darkened states in a large area electrochromic device can be slow and spatially non-uniform. Gradual, non-uniform coloring or switching is a common problem associated with large area electrochromic devices. This problem, commonly referred to as the "iris effect," is typically the result of the voltage drop through the transparent conductive coatings providing electrical contact to one side or both sides of the device. For example, when a voltage is initially applied to the device, the potential is typically the greatest in the vicinity of the edge of the device (where the voltage is applied) and the least at the center of the device. As a result, there may be a significant difference between the transmissivity near the edge of the device (e.g., in the vicinity of the applied potential) and the transmissivity at the center of the device during switching. The spatial non-uniformity, however, is typically transient, and over time the difference in potential between the center and edge decreases causing the difference in transmissivity at the center and edge of the device to decrease as well. While the iris effect is most commonly observed in relatively large devices, it also can be present in smaller devices that have correspondingly higher resistivity conducting layers.

BRIEF DESCRIPTION OF THE DRAWINGS

To facilitate further description of the embodiments, the following drawings are provided in which:

FIG. 5B shows an example where the sets of scribed lines all contain two scribed lines, the valve width and the offset between segments in adjacent scribed lines are all constant for every set of scribed lines $x_n$, but the length of the scribed segments are different for different sets of scribed lines, causing the resistance to the flow of electrons traversing a set of scribed lines to be different for different sets of scribed lines.

FIG. 8A is a schematic of a curved scribed line segment with regular repeating sub-segments that is used to create a gradient transparent conductive layer in EC devices, in accordance with some embodiments.

FIG. 8B is a schematic of a curved scribed line segment with irregular sub-segments that is used to create a gradient transparent conductive layer in EC devices, in accordance with some embodiments.

FIG. 11A shows 2-dimensional modeled diffracted intensities from a set of regular curved scribed line segments, in accordance with some embodiments.

FIG. 11B shows 2-dimensional modeled diffracted intensities from a set of irregular curved scribed line segments, in accordance with some embodiments.

FIG. 14 is a schematic of a patterned electrically conductive layer with a transparent conducting material with a number of sets of scribed lines patterned into the transparent conducting material and a bus bar. Additionally, FIG. 14 includes a plot of resistance between the bus bar and a line parallel to the bus bar is (where the bus bar is at x=0, and the parallel line is at a position x) versus position (x), in accordance with some embodiments.

Figure 1A:
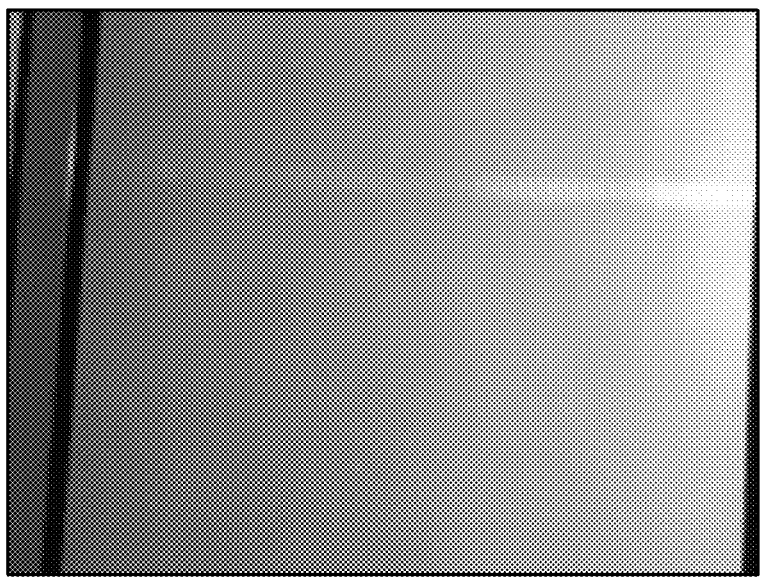
FIG. 1A is a photograph of an electrochromic (EC) window with scribed gradient transparent conducting layers. The scribed line segments are straight, and there is a pronounced rainbow colored visual streak caused by diffracted light from a bright light source. The window in this figure shows a "transmissive" rainbow pattern, seen through a lightened (i.e., bleached) electrochromic skylight with the sun barely out of frame.

Corresponding reference characters indicate corresponding parts throughout the drawings. Additionally, relative thicknesses of the layers in the different figures do not represent the true relationship in dimensions. For example, the substrates are typically much thicker than the other layers. The figures are drawn only for the purpose to illustrate connection principles, not to give any dimensional information, unless a dimension is specifically noted.

DETAILED DESCRIPTION

Electrochromic (EC) devices with transparent conductive layers having non-uniform electrical properties can have improved spatial uniformity of their optical properties during switching between different light transmission levels compared to devices with uniform transparent conductive layers. In other words, electrochromic devices with non-uniform transparent conductive layers can uniformly transition, or switch, between more transmissive and less transmissive states across the entire device during a transition between tint levels. This "uniform switching" may be enabled by creating a transparent conductive layer with a gradient in electrical properties that is in contact with the electrodes of the electrochromic device. This "gradient transparent conductive layer" can have the effect of mitigating the drop in effective voltage across the device. This is most noticeable in large scale electrochromic devices, such as architectural or vehicular windows, with enough distance between the bus bars that there is a significant drop in effective voltage within the transparent conductive layer across the area of the EC device.

In some embodiments, gradient patterns in transparent conductive layers provide uniform switching in electrochromic devices. These gradient patterns may be formed in a transparent electrically conductive layer having an approximately uniform thickness across the substrate of the electrochromic device.

Figure 1B:
FIG. 1B is a photograph of an EC window with scribed gradient transparent conducting layers. The scribed line segments are straight, and there is a pronounced rainbow colored visual streak caused by diffracted light from a bright light source. The window in this figure shows a "reflective" rainbow pattern seen off a darkened electrochromic window from outside the building, with the sun behind and above the observer (i.e. the camera capturing the image).

The plurality of curved scribed line segments used to create the patterned transparent conductive layer in electrochromic (EC) windows can under some circumstances cause visual patterns on the window (e.g., rainbow colored streaks) due to diffraction effects. FIGS. 1A and 1B show two examples of these visible patterns in electrochromic windows with patterns of scribed line segments in the transparent conductive layers. When the window is clear, the visual patterns tend to be most visible in transmission. When the window is dark, the visual patterns tend to be most visible in reflection. FIG. 1A shows a "transmissive" rainbow pattern, seen through a lightened electrochromic skylight with the sun barely out of frame. FIG. 1B shows a "reflective" rainbow pattern seen off a darkened electrochromic window from outside the building, with the sun behind and above the observer (i.e. the camera capturing the image).

In some cases, the transparent electrically conductive layer has a different index of refraction compared to the surrounding layers, which may cause diffraction effects (i.e., interference effects) due to the phase difference of the light travelling through the device in places where there is no transparent conductive layer (i.e., the scribes) compared to the light travelling through the device in places where there is transparent conductive layer (i.e., the material adjacent to the scribes).

Throughout this disclosure, the terms scribed lines and scribed line segments are used interchangeably with other similar terms such as patterned features. It should be noted that the scribed line segments can be produced by any methods, including methods that do not employing scribing.

For example, the scribed line segments could be produced by laser scribing, mechanical scribing, photolithography, or by depositing one or more layers through patterned shadow masks.

Electrochromic Device Structure

Figure 2:
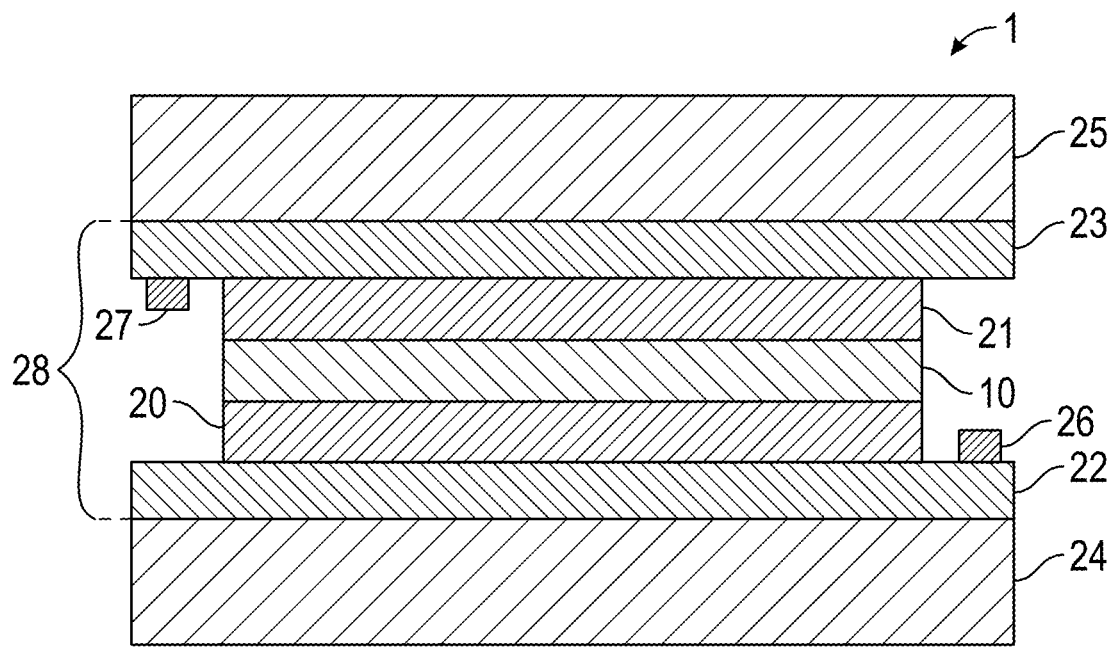
FIG. 2 is a schematic cross-section of a multi-layer electrochromic device of the present invention, in accordance with some embodiments.

FIG. 2 depicts a cross-sectional structural diagram of electrochromic device 1 according to a first embodiment of the present invention. Moving outward from the center, electrochromic device 1 comprises an ion conductor layer 10. First electrode layer 20 is on one side of and in contact with a first surface of ion conductor layer 10, and second electrode layer 21 is on the other side of and in contact with a second surface of ion conductor layer 10. In addition, at least one of first and second electrode layers 20, 21 comprises electrochromic material; in one embodiment, first and second electrode layers 20, 21 each comprise electrochromic material. The central structure, that is, layers 20, 10, 21, is positioned between first and second electrically conductive layers 22 and 23 that are formed of gradient transparent conductive layers. These electrically conductive layers are arranged against outer substrates 24, 25. Elements 22, 20, 10, 21, and 23 are collectively referred to as an electrochromic stack 28.

Electrically conductive layer 22 is in electrical contact with one terminal of a power supply (not shown) via bus bar 26 and electrically conductive layer 23 is in electrical contact with the other terminal of a power supply (not shown) via bus bar 27 whereby the transmissivity of electrochromic device 10 may be changed by applying a voltage that causes electrons and ions to move between first and second electrode layers 20 and 21 and, as a result, electrochromic material in the first and/or second electrode layer(s) change(s) optical states, thereby switching electrochromic device 1 from a more transmissive state to a less transmissive state, or from a less transmissive state to a more transmissive state. In one embodiment, electrochromic device 1 is transparent before the voltage pulse and less transmissive (e.g., more reflective or colored) after the voltage pulse or vice versa.

The materials making up electrochromic stack 28 may comprise organic or inorganic materials, and they may be solid or liquid. For example, in certain embodiments the electrochromic stack 28 comprises materials that are inorganic, solid (i.e., in the solid state), or both inorganic and solid. Inorganic materials have shown better reliability in architectural applications. Materials in the solid state can also offer the advantage of not having containment and leakage issues, as materials in the liquid state often do. It should be understood that any one or more of the layers in the stack may contain some amount of organic material, but in many implementations one or more of the layers contains little or no organic matter. The same can be said for liquids that may be present in one or more layers in small amounts. In certain other embodiments some or all of the materials making up electrochromic stack 28 are organic. Organic ion conductors can offer higher mobilities and thus potentially better device switching performance. Organic electrochromic layers can provide higher contrast ratios and more diverse color options. Each of the layers in the electrochromic device is discussed in detail, below. It should also be understood that solid state material may be deposited or otherwise formed by processes employing liquid components such as certain processes employing sol-gels or chemical vapor deposition.

At least one of the two electrically conductive layers 22, 23 is also preferably a transparent conductive layer in order to reveal the electrochromic properties of the stack 28 to the surroundings. In one embodiment, electrically conductive layer 23 is transparent. In another embodiment, electrically conductive layer 22 is transparent. In another embodiment, electrically conductive layers 22, 23 are each transparent. In certain embodiments, one or both of the electrically conductive layers 22, 23 is inorganic and/or solid. Electrically conductive layers 22 and 23 may be made from a number of different transparent materials, including transparent conductive oxides, thin metallic coatings, networks of conductive nanoparticles (e.g., rods, tubes, dots) conductive metal nitrides, and composite conductors. Transparent conductive oxides include metal oxides and metal oxides doped with one or more metals. Examples of such metal oxides and doped metal oxides include indium oxide, indium tin oxide, doped indium oxide, tin oxide, doped tin oxide, zinc oxide, aluminum zinc oxide, doped zinc oxide, ruthenium oxide, doped ruthenium oxide and the like. Transparent conductive oxides are sometimes referred to as (TCO) layers. Thin metallic coatings that are substantially transparent may also be used. Examples of metals used for such thin metallic coatings include gold, platinum, silver, aluminum, nickel, and alloys of these. Examples of transparent conductive nitrides include titanium nitrides, tantalum nitrides, titanium oxynitrides, and tantalum oxynitrides. Electrically conducting layers 22 and 23 may also be transparent composite conductors. Such composite conductors may be fabricated by placing highly conductive ceramic and metal wires or conductive layer patterns on one of the faces of the substrate and then over-coating with transparent conductive materials such as doped tin oxides or indium tin oxide. Ideally, such wires should be thin enough as to be invisible to the naked eye (e.g., about 100 µm or thinner). Non-exclusive examples of electron conductors 22 and 23 transparent to visible light are thin films of indium tin oxide (ITO), tin oxide, zinc oxide, titanium oxide, n- or p-doped zinc oxide and zinc oxyfluoride. Metal-based layers, such as ZnS/Ag/ZnS and carbon nanotube layers have been recently explored as well. Depending on the particular application, one or both electrically conductive layers 22 and 23 may be made of or include a metal grid.

The thickness of the electrically conductive layer may be influenced by the composition of the material comprised within the layer and its transparent character. In some embodiments, electrically conductive layers 22 and 23 are transparent and each have a thickness that is between about 1000 nm and about 50 nm. In some embodiments, the thickness of electrically conductive layers 22 and 23 is between about 500 nm and about 100 nm. In other embodiments, the electrically conductive layers 22 and 23 each have a thickness that is between about 400 nm and about 200 nm. In general, thicker or thinner layers may be employed so long as they provide the necessary electrical properties (e.g., conductivity) and optical properties (e.g., transmittance). For certain applications it will generally be preferred that electrically conductive layers 22 and 23 be as thin as possible to increase transparency and to reduce cost.

Referring again to FIG. 2, the function of the electrically conductive layers is to apply the electric potential provided by a power supply over the entire surface of the electrochromic stack 28 to interior regions of the stack. The electric potential is transferred to the conductive layers though electrical connections to the conductive layers. In some embodiments, bus bars, one in contact with first electrically conductive layer 22 and one in contact with second electrically conductive layer 23 provide the electric connection between the voltage source and the electrically conductive layers 22 and 23.

The sheet resistance, $R_s$, of the first and second electrically conductive layers 22 and 23 without any scribed line segments can vary from about 500Ω/□ to 1Ω/□, or from about 100Ω/□ to 5Ω/□, or from about 50Ω/□ to 5Ω/□, or from about 25Ω/□ to 5Ω/□, or from about 20Ω/□ to 5Ω/□, or from about 10Ω/□ to 5Ω/□, or from about 30Ω/□ to 10Ω/□, or from about 20Ω/□ to 10Ω/□. The sheet resistance of a layer (or an elongate structure) can refer to the resistance to current flow substantially parallel to a major surface of the layer (or the elongate structure).

The multi-layer devices of the present invention may have a rectangular shape, or a shape other than rectangular, may have two bus bars, or may have more than two bus bars, may have the bus bars on the opposite sides of the device, and/or may not have the bus bars on opposite sides of the device. For example, the multi-layer device may have a perimeter that is more generally a quadrilateral, or a shape with greater or fewer sides than four for example, the multi-layer device may be triangular, pentagonal, hexagonal, etc., in shape. By way of further example, the multi-layer device may have a perimeter that is curved but lacks vertices, e.g., circular, oval, etc. By way of further example, the multi-layer device may comprise three, four or more bus bars connecting the multi-layer device to one or more power supplies, or the bus bars, independent of number may be located on non-opposing sides. In each of such instances, the preferred resistance profile in the electrically conductive layer(s) may vary from that which is described for the rectangular, two bus bar configuration.

Electrochromic Device with Improved Switching Uniformity

Figure 3:
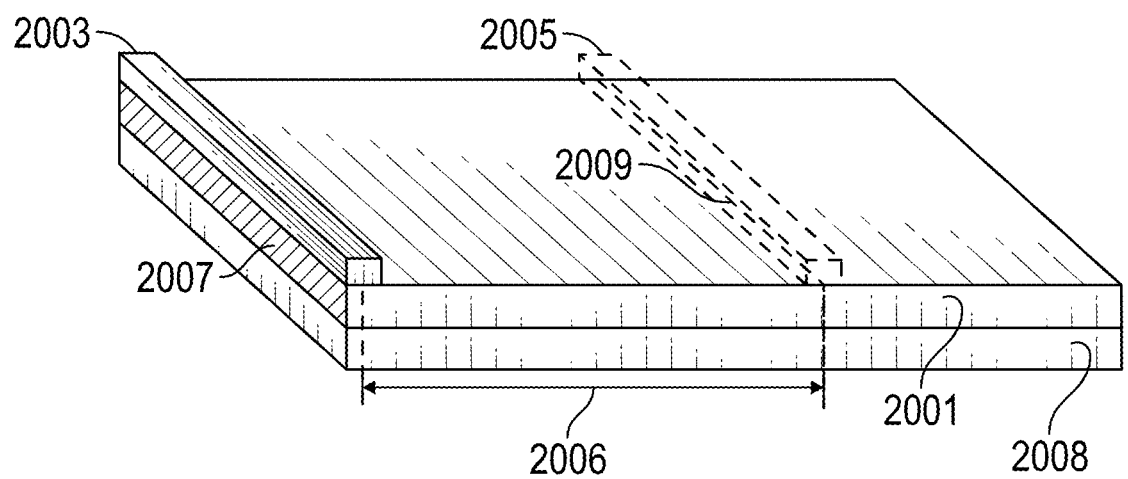
FIG. 3 is a schematic of an electrochromic device with a substrate, an electrically conductive layer on top of the substrate, and a bus bar applied to one edge, in accordance with some embodiments.

In one exemplary instance, a substrate of an electrochromic device contains an electrically conductive layer, and the substrate and electrically conductive layer are substantially rectangular, and there is one or more electrical connections (e.g., bus bars) applied on the electrically conductive layer. FIG. 3 shows such an electrochromic device with a substrate 2008, an electrically conductive layer 2001 on top of the substrate, and a bus bar applied to one edge 2003. The resistance between the bus bar, and a substantially parallel line in the first electrically conductive layer (shown as a dot-dash line in the FIG. 2009 may be defined. In this disclosure, the resistance between a bus bar and a substantially parallel line in an electrically conductive layer is equivalent to the resistance that would be measured if an ohmic test contact 2005 (with zero contact resistance) was connected, or temporarily applied, to the electrically conductive layer along the line and the resistance was measured between the bus bar and the test contact. If the electrically conductive layer is uniform, then the resistance between a bus bar and a substantially parallel line would increase linearly as the distance between the bus bar and the parallel line increased, and can be described by the equation $r = \rho * l/A$, where r is the resistance between the bus bar and a substantially parallel line on the electrically conductive layer, $\rho$ is the bulk resistivity of the top electrically conductive layer, l is the distance between the bus bar and the line 2006, and A is the cross-sectional area of the electrically conductive layer 2007.

Alternatively, if the electrically conductive layer is non-uniform as a function of position perpendicular to the bus bar, then the resistance between the bus bar and a substantially parallel line will increase non-linearly as the distance between the bus bar and the line increases. In some cases, the bulk resistivity of the electrically conductive layer is non-uniform. In some cases, the cross-sectional area of the electrically conductive layer is non-uniform (e.g. the thickness varies across the substrate). In some cases, the electrically conductive layer may be patterned, so that the resistance from the bus bar to a substantially parallel line varies non-linearly, as is described more completely below.

There are different ways to create gradients in the transparent conductive layers. The gradients may be accomplished by any technique that creates a non-linearly varying resistance between the bus bar and a line on the layer, such as by changing the sheet resistance of the electrically conductive layer or by patterning the electrically conductive layer. The sheet resistance of the electrically conductive layer may be changed by changing the layer thickness or the electrical properties of the materials of the electrically conductive layer. For example, the electrical properties of the electrically conductive layer materials can change by changing the resistivity of thin film materials (e.g., by changing the composition, dopant/impurity concentrations, or crystallinity of the materials), changing the morphology of a nanostructured conductive layer (e.g., the spacing between conductive nanowires), or changing the electrical properties of a nanostructured conductive layer (e.g., the inter-wire resistance of a nanowire mesh). The gradients in thickness or electrical properties of the electrically conductive layer(s) can be smoothly varying, or discretely varying. In some cases, discrete patterns are formed on one or both electrically conductive layers, which cause the resistance between the bus bar and a line within one or both electrically conductive layers to vary non-linearly. In some embodiments, the sheet resistance of one or more electrically conductive layer(s) is changed and discrete patterns are formed on one or both electrically conductive layers, which cause the resistance between the bus bar and a line within one or both electrically conductive layers to vary non-linearly.

As will be described in more depth below, a non-linear change in the resistance between the bus bar and a line on one or both electrically conductive layers is advantageous in electrochromic devices, because it enables the local potential between the two electrically conductive layers of the device to be more uniform over the area of a device, and therefore the electrochromic device is enabled to have more spatially uniform optical properties (e.g., transmission) during switching. An electrochromic device with varying sheet resistance of one or more electrically conductive layer(s), may have improved uniformity during switching. An electrochromic device with discrete patterns formed on one or both electrically conductive layers, may have improved uniformity during switching. An electrochromic device with varying sheet resistance of one or more electrically conductive layer(s), and discrete patterns on one or both electrically conductive layers, may also have improved uniformity during switching.

Isoresistance lines and resistance gradient lines can be plotted to describe a non-uniform sheet resistance of an electrically conductive layer. Isoresistance lines join points of equal sheet resistance, and resistance gradient lines are perpendicular to isoresistance lines. Referring to FIG. 2, in general, and independent of whether the multi-layer device has a shape other than rectangular, there are more than two electrical connections (e.g., bus bars), and/or the electrical connections (e.g., bus bars) are on opposite sides (and/or on opposite substrates) of the device, the sheet resistance, $R_s$, in the first electrically conductive layer 22, in the second electrically conductive layer 23, or in the first electrically conductive layer 22 and the second electrically conductive layer 23 may be plotted to join points of equal sheet resistance (i.e., isoresistance lines) as a function of (two-dimensional) position within the first and/or second electrically conductive layer. Plots of this general nature, sometimes referred to as contour maps, are routinely used in cartography to join points of equal elevation. In the context of the present invention, a contour map of the sheet resistance, $R_s$, in the first and/or second electrically conductive layer as a function of (two-dimensional) position within the first and/or second electrically conductive layer preferably contains a series of isoresistance lines (also sometimes referred to as contour lines) and resistance gradient lines (lines perpendicular to the isoresistance lines). The sheet resistance along a gradient line in the first and/or second electrically conductive layer(s) may be constant, or generally increase(s), or generally decrease(s), or generally increase(s) until it reaches a maximum and then generally decrease(s), or generally decrease(s) until it reaches a minimum and then generally increase(s).

Without wishing to be bound by any particular theory, and based upon certain experimental evidence obtained to-date, the local potential (i.e., voltage) between the electrically conductive layers in an electrochromic stack can be made substantially constant as a function of position by varying the sheet resistance in the two electrically conductive layers of the device. The local potential between the electrically conductive layers can also be referred to as the local device potential, or local cell potential. There are particular relationships between the sheet resistance of the first and second electrically conductive layers which will provide a substantially uniform local cell potential across the area of an electrochromic device. For the geometry shown in FIG. 4A, with a rectangular top electrically conductive layer 2001, and a rectangular bottom electrically conductive layer 2002, a contact (bus bar 2003) to the top electrically conductive layer is made at x=0, and a contact (bus bar 2004) to the bottom electrically conductive layer is made at $x=x_t$, the relationship to provide a substantially uniform local cell potential is $$R'(x)=R(x)*(x_t/x-1),$$

where R(x) is the sheet resistance of the top electrically conductive layer as a function of position and R'(x) is the sheet resistance of the bottom electrically conductive layer as a function of position, and where the sheet resistance of the top and bottom electrically conductive layers are substantially constant in the y-direction for a given value of x. In this embodiment, the resistance gradient lines are oriented substantially along the x direction and the isoresistance lines are oriented substantially along the y-direction, for both the top and bottom electrically conductive layers. In this embodiment, with the geometry shown in FIG. 4A, the top and bottom electrically conductive layers are substantially parallel, and a point on the bottom electrically conductive layer $(x_1,y_1,z_1)$ can be projected onto a point on the top electrically conductive layer $(x_1,y_1,z_2)$, as shown in the figure. An example of a solution of sheet resistance profiles that satisfy this relationship is a linear change in the sheet resistance of the top electrode, R(x)=a*x, and the sheet resistance of the bottom electrode $R'(x)=a*(x_t-x)$, where the sheet resistance of the top and bottom electrically conductive layers are substantially constant in the y-direction for a given value of x. FIG. 4B shows another example solution where $R(x)=1/[a*(x_t-x)]$ and $R'(x)=1/(a*x)$. In this case, the sheet resistance of the top and bottom electrically conductive layers are substantially constant in the y-direction for a given value of x.

r(x) is defined as the resistance between the bus bar 2003 and a line 2009 parallel to the bus bar in the top electrically conductive layer, where the line 2009 is at a position x (shown in the figure at position $x_1$). r'(x) is defined as the resistance between the bus bar 2004 and a line 2010 parallel to the bus bar in the bottom electrically conductive layer, where the line 2010 is at a position x (shown in the figure at position $x_1$). The equation that describes r(x) is the integral of the sheet resistance R(x) of the top electrically conductive layer divided by the top electrically conductive layer width W, $$r(x)=\int[R(x)/W]dx,$$

evaluated in the interval from x=0 to x=x. The equation that describes r'(x) is the integral of the sheet resistance R'(x) of the bottom electrically conductive layer divided by the bottom electrically conductive layer width W, $$r'(x)=\int[R'(x)/W]dx,$$

evaluated in the interval from x=x to $x=x_t$.

As a practical matter, devices do not need to precisely adhere to these relationships to realize the benefits of this invention. For example, in the case above where R'(x)=1/(a*x), R'(0)=infinity. While one can practically create resistances of very large magnitude, a film with a R'(x)=1/(a*x+b) where b is small relative to a can exhibit significantly improved switching uniformity over a device with electrodes of uniform sheet resistance Electrochromic Devices with Patterned Electrically Conductive Layers to Provide a Uniform Cell Potential In rectangular electrochromic devices, patterns in the electrically conductive layers can be utilized to vary the resistance between the bus bar and a line parallel to the bus bar in the electrically conductive layers. In this case, the above relationships can be used to determine the specifications for the pattern that will improve the uniformity of the local cell potential across the area of the device. The integrals described above (that determine the resistance between the bus bar and a line parallel to the bus bar in an electrically conductive layer for a given desired sheet resistance profile) can be evaluated in different intervals, and the resulting values can be used to determine the patterns required to vary the resistance along gradient lines. The improved uniformity of the local cell potential will enable the electrochromic device to switch more uniformly.

Figure 5A:
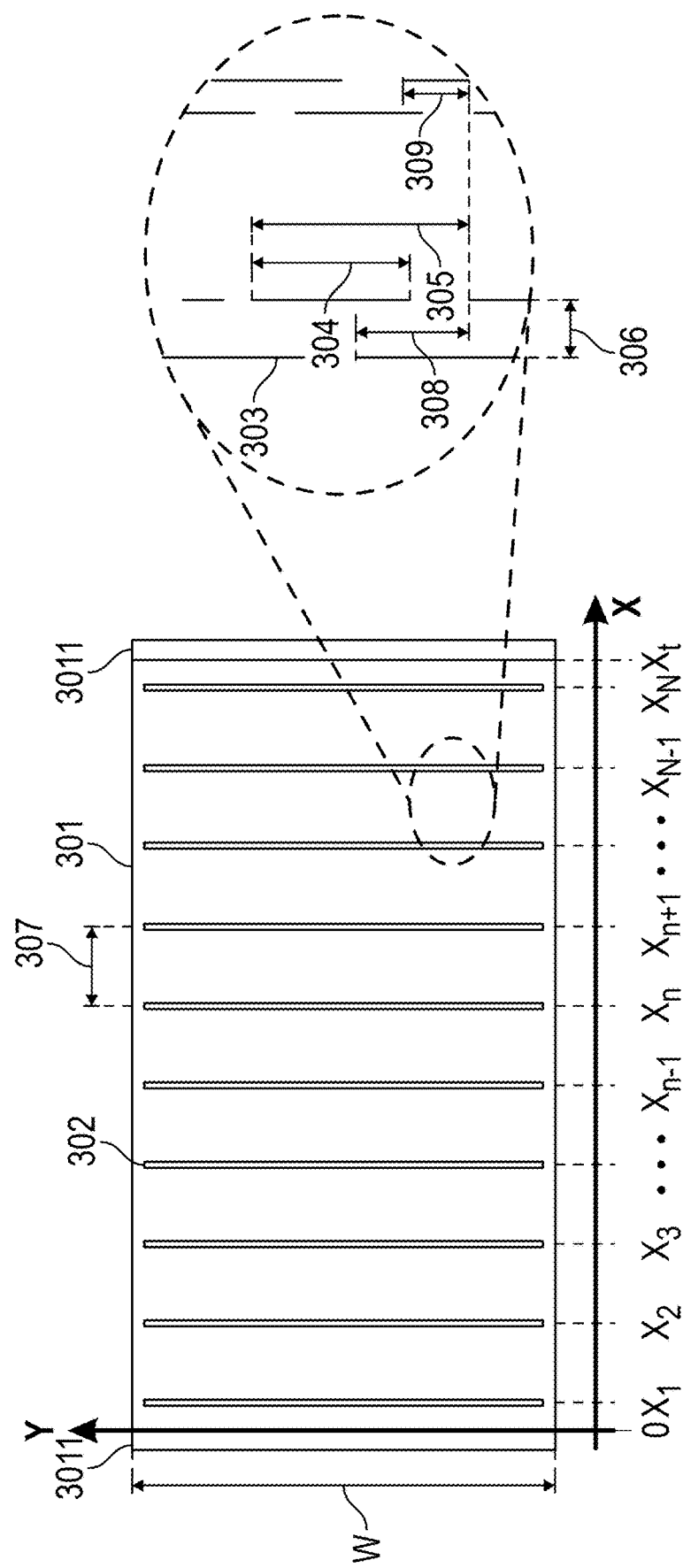
FIG. 5A is a schematic of a patterned electrically conductive layer with a transparent conducting material with a number of sets of scribed lines, which are patterned into the transparent conducting material, in accordance with some embodiments. The dark areas in the magnified region are a pattern of lines that represent gaps in the electrically conductive layer.

For example, FIG. 5A shows a patterned electrically conductive layer 301 with a transparent conducting material with a number of sets of scribed line segments 302, which are patterned into the transparent conducting material. The dimensions of the geometrical parameters of the patterns are chosen to create the required resistance profiles according to the above relationships in order to improve the uniformity of the potential between the electrically conductive layers of the electrochromic stack (i.e., the local cell potential).

The dark areas in the magnified region in FIG. 5A are a pattern of line segments 303 that represent gaps in the electrically conductive layer. For instance, the electrically conductive layer 301 can be a transparent electrically conductive material (e.g., a transparent electrically conductive oxide such as indium tin oxide, fluorine-doped tin oxide, or aluminum-doped zinc oxide), and the dark line segments 303 of the pattern represent areas where the transparent electrically conductive material has been removed. In some cases, the pattern of gaps in the transparent electrically conductive material are formed by laser ablation. In some cases, the pattern of gaps in the transparent electrically conductive material are formed by chemical etching using a mask (e.g., where the mask is patterned by photolithography). In some cases, the gaps extend through the entire thickness of the transparent electrically conductive material, while in other cases the gaps only extend partially through the electrically conductive material. In some cases, the gaps are formed by a patterned mask used during selective deposition of the transparent electrically conductive material, such as a shadow mask during physical vapor deposition.

In cases where the electrically conductive layer is composed of a transparent electrically conducting material, the sheet resistance of the transparent electrically conducting material is defined as $R_{TC}(x)$. $R_{TC}(x)$ can be constant in some cases (e.g. if the transparent electrically conducting material is a transparent conducting oxide with uniform thickness). While in some cases, $R_{TC}(x)$ varies with position (e.g. if the transparent electrically conducting material is a transparent conducting oxide with varying thickness).

In the example shown in FIG. 5A, each set of scribed line segments 302 contains a number of scribed line segments. Each scribed line segment is made up of a series of collinear line segments 303, which are gaps in the transparent electrically conductive layer. The length 304 of the collinear segments, the period 305 of the collinear segments, the valve width 306 and the offset 308 between scribed line segments in adjacent scribed lines determine the resistance to the flow of electrons traversing a set of scribed lines in the x direction. FIG. 5A also shows that there can be a period offset 309 between sets of scribed line segments. FIG. 5A shows that there are N sets of scribed line segments 302 in the electrically conductive layer. The bus bar 3011 in this example is either at x=0 (i.e., on one electrically conductive layer, such as 27 in FIG. 1, and 2003 in FIG. 4A), or at $x=x_t$ (i.e., on the opposing electrically conductive layer (i.e., 26 in FIG. 1, and 2004 in FIG. 4A). In general, the x-positions of the sets of scribed line segment are described as $[x_1, x_2, x_3, \ldots x_{n-1}, x_n, x_{n+1}, \ldots x_{N-1}, x_N]$.

In the rectangular electrochromic device shown in FIG. 5A the set of scribed line segments $x_n$ can correspond to the scribed line segments in the top or bottom transparent electrically conductive layer. The resistance across a set of scribed line segments (e.g., in the direction perpendicular to the width) can be defined similarly to the resistance between a bus bar and a line in the transparent electrically conductive layer. In this case, two lines can be defined, one on either side of the set of scribed line segments, where the scribed line segments and the set of scribed line segments are parallel to each other, and to an edge of the substrate, and have a length equal to W. The resistance between the two sets of scribed line segments will, in general, be equal to the sum of the resistance caused by the sheet resistance of the transparent electrically conducting layer material, and the resistance added by the set of scribed line segments. The designation $r_n$ is defined as the resistance added by the set of scribed line segments. In other words, if two test contacts were connected to the electrically conductive layer along two lines on either side of the set of scribed line segments, then they would measure a resistance equal to the sum of the resistance of the transparent electrically conductive layer (roughly equal to $\rho *l/A$, where $\rho$ is the bulk resistivity of the electrically conductive layer, I is distance between the test contacts, and A is W*t, there t is the thickness of the transparent electrically conductive layer) and $r_n$ (the resistance from the pattern of scribed line segments).

Figure 5B:
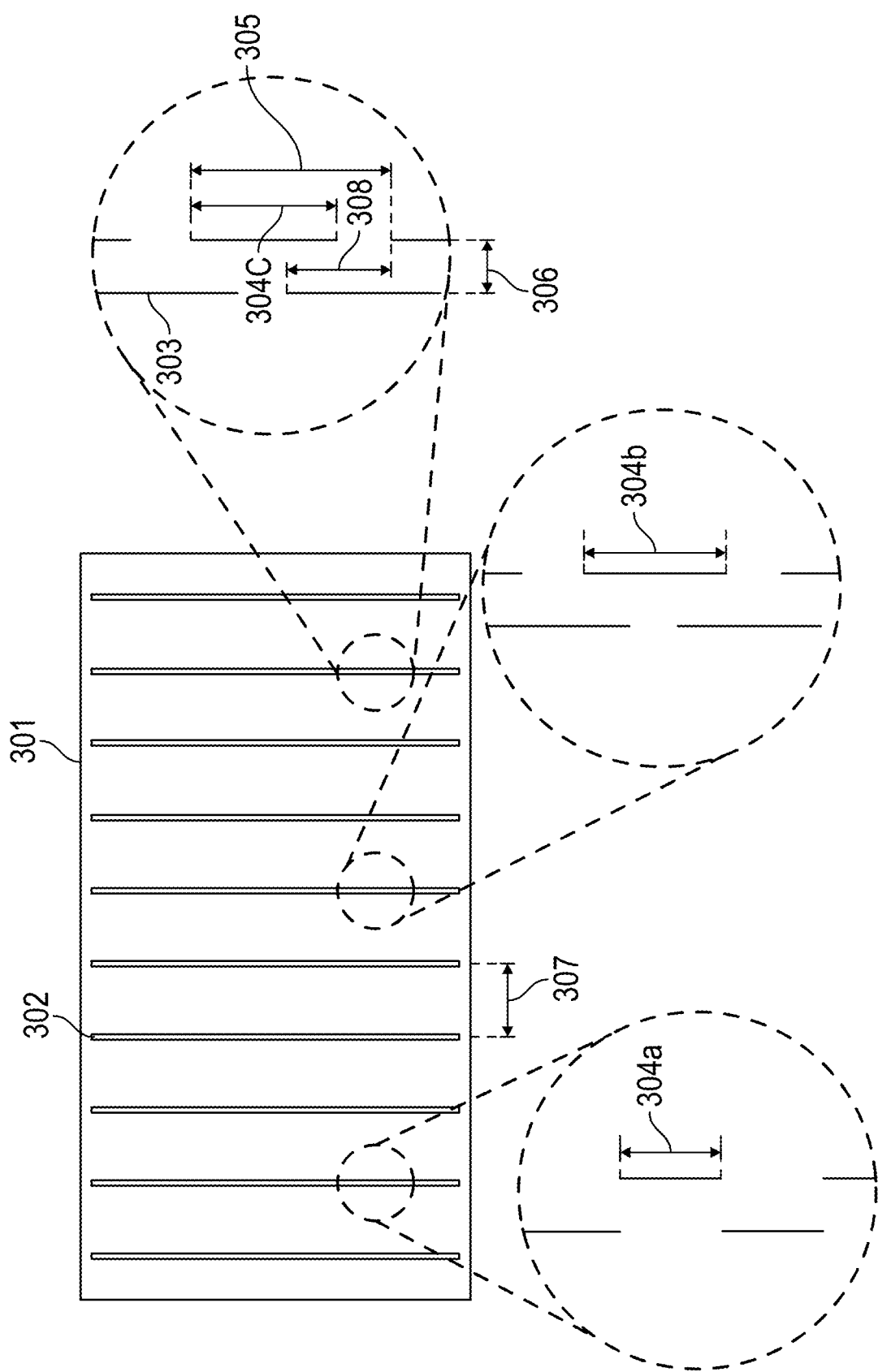
FIG. 5B is a schematic of a patterned electrically conductive layer with a transparent conducting material with a number of sets of scribed lines, which are patterned into the transparent conducting material, in accordance with some embodiments.

In order to approximate sheet resistances adhering to the above relationships between R(x) and R'(x), different sets of scribed line segments will have different resistances to the flow of electrons in the x direction, and therefore the parameters of the scribed line segments (e.g., 303, 304, 305, 306 and/or 308) will vary between sets of scribed line segments. FIG. 5B shows an example where the sets of scribed line segments all contain two scribed lines. In this example, the period 305, the valve width 306 and the offset 308 between scribed line segments in adjacent scribed line segments are all constant for every set of scribed line segments $x_n$. However, the length of the scribed line segments 304a, 304b and 304c are different for different sets of scribed line segments. Therefore, the resistance to the flow of electrons traversing the sets of scribed line segments $x_n$ in the x direction will be different for different sets of scribed line segments.

In general, the total resistance between the bus bar and a line in the transparent electrically conductive layer is the sum of the resistance of the patterned features (e.g., sets of scribed line segments in the example above), and the resistance of the transparent electrically conductive material itself.

Figure 4A:
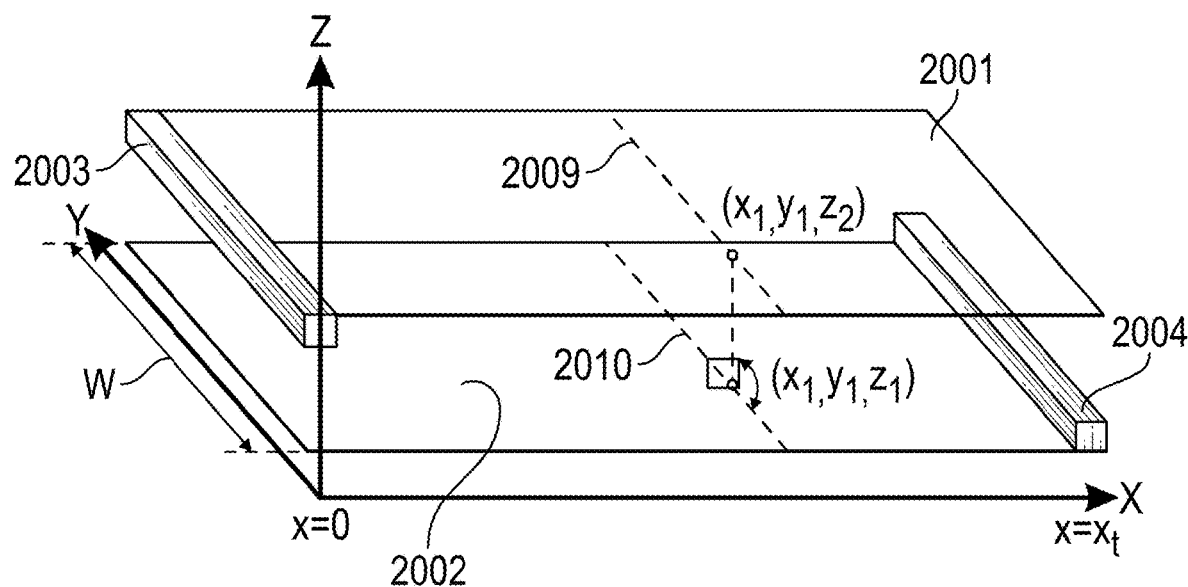
FIG. 4A is a schematic of a top electrically conductive layer 2001, a bottom electrically conductive layer, a contact (bus bar) to the top electrically conductive layer is made at x=0, and a contact (bus bar) to the bottom electrically conductive layer is made at $x=x_t$, in accordance with some embodiments.
Figure 4B:
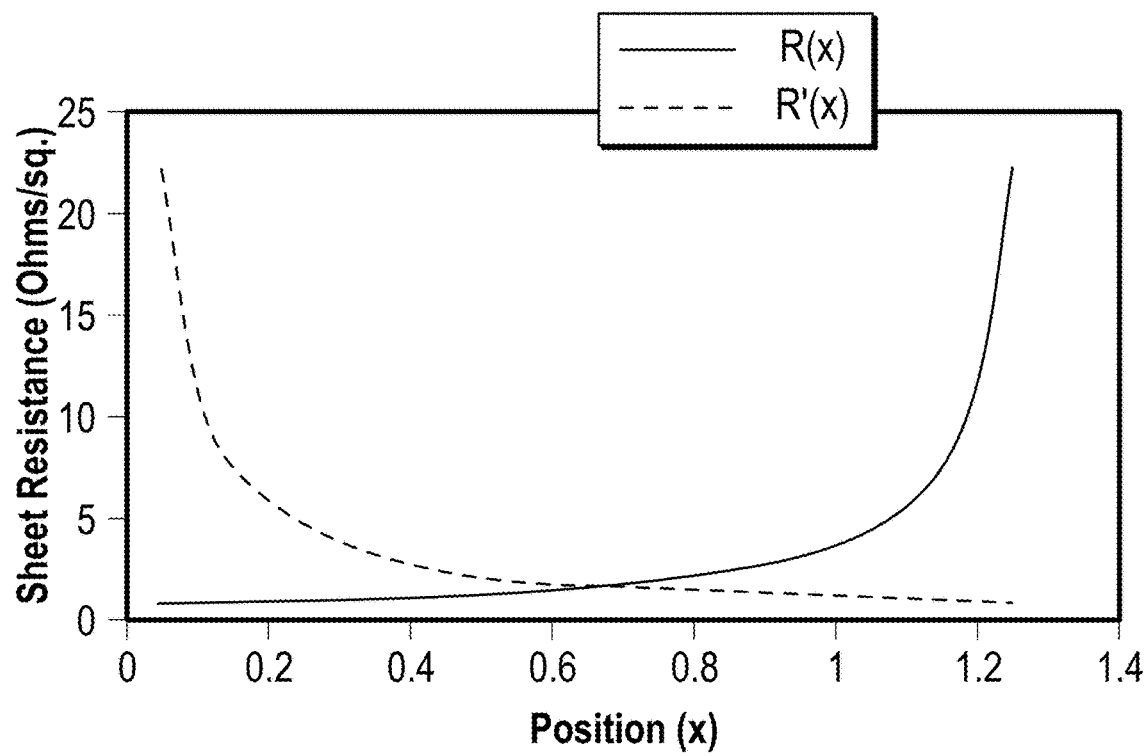
FIG. 4B is a plot of R(x), the sheet resistance of the top electrically conductive layer from FIG. 4A as a function of position (x), and R'(x), the sheet resistance of the bottom electrically conductive layer from FIG. 4A as a function of position (x), in accordance with some embodiments.
Figure 6A:
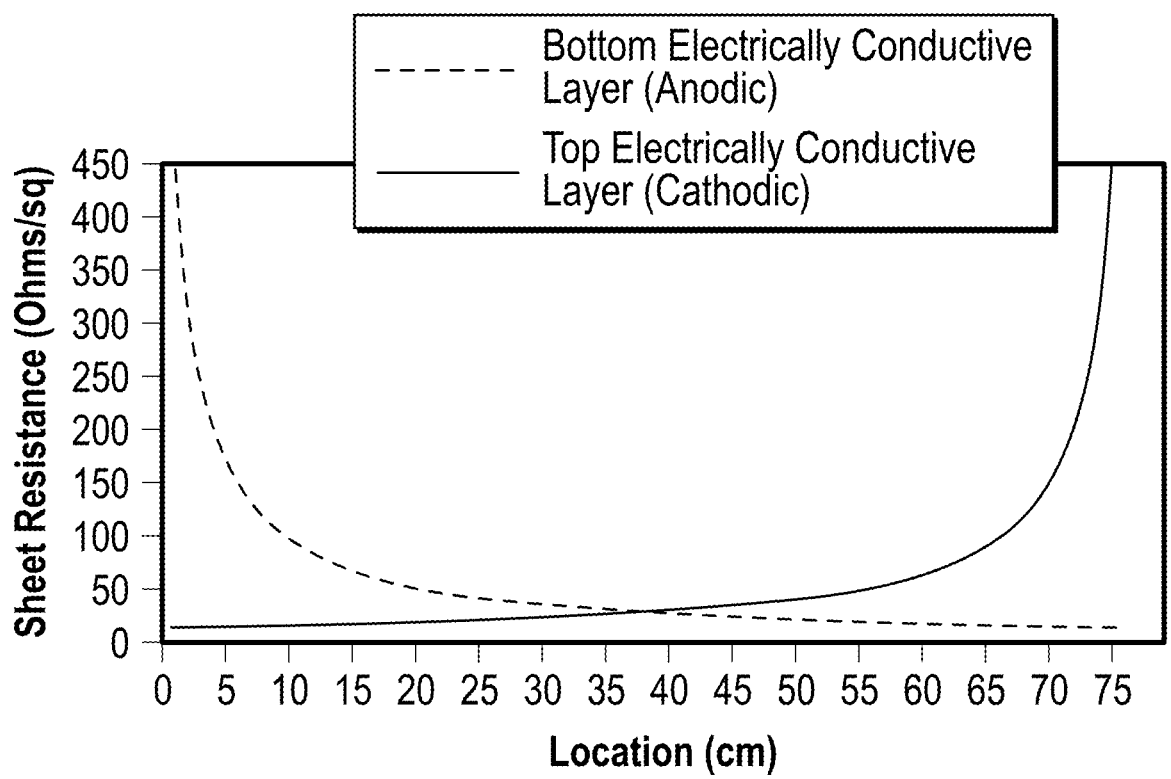
FIG. 6A is a plot of the sheet resistance profile along resistance gradient lines for both substrates in the simple geometry described in FIG. 4A, in accordance with some embodiments.

FIG. 6A shows an example of a sheet resistance profile along resistance gradient lines for both substrates in a device with the geometry described in FIG. 4A. The device in this example was approximately 75 cm long, and 130 cm wide. The bus bar on the top electrically conductive layer (the cathode in this case) was at x=0 cm, and the bus bar on the bottom electrically conductive layer (the anode in this case) was at approximately x=75 cm. The width (W) of both substrates and electrically conductive layers was 130 cm. In this example, both the top and bottom electrically conductive layers were patterned to approximate the sheet resistance profiles shown in FIG. 6A. The desired sheet resistance varied from approximately 15 Ohm/sq. to approximately 450 Ohm/sq.

The sheet resistance profiles in this example followed the form of $R(x)=1/[a*(x_t-x)]$ and $R'(x)=1/(a*x)$, in order to satisfy the relationship between the sheet resistance profiles of the two substrates $R'(x)=R(x)*(x_t/x-1)$ (as discussed herein). As discussed herein, this relationship enables the device to have a more uniform potential between the two electrically conductive layers over the whole area of the device, even though the bus bars are located at the edges.

Figure 6B:
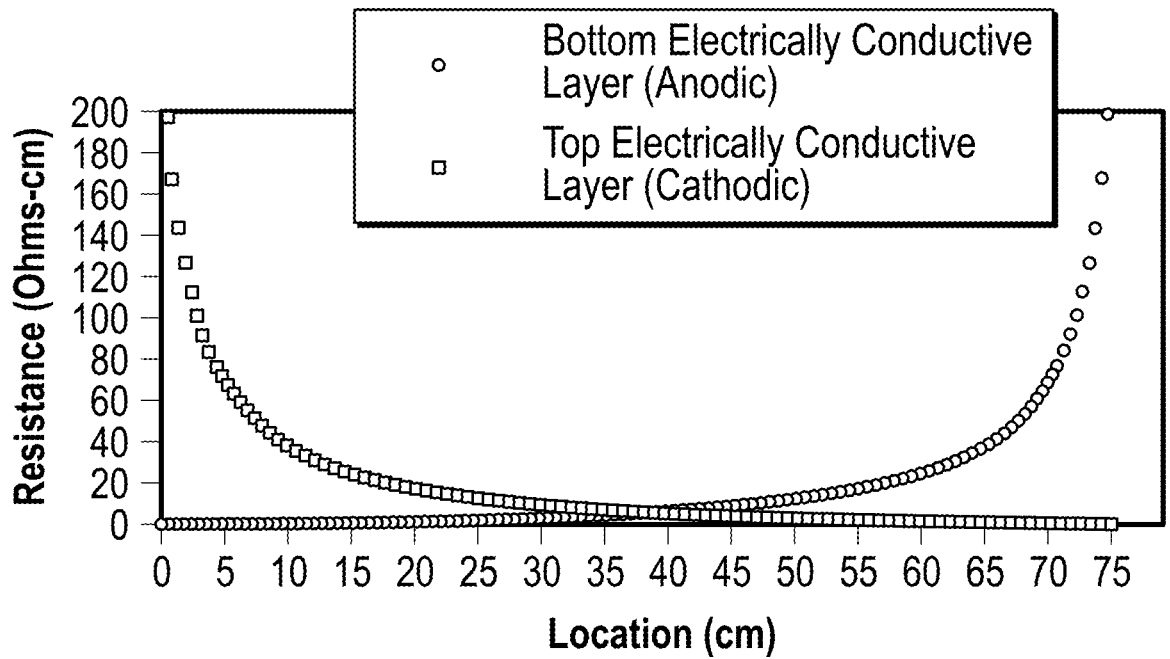
FIG. 6B is a plot of the resistance of sets of scribed lines that will approximate the sheet resistance profiles shown in FIG. 6A, in accordance with some embodiments.

FIG. 6B shows the resistance of sets of scribed lines that approximated the sheet resistance profiles shown in FIG. 6A, in this example. The sets of scribed lines on both substrates were oriented parallel to the bus bar (i.e., along isoresistance lines perpendicular to the resistance gradient lines) as shown in FIGS. 5A and 5B. In this example the pitch (i.e., 307 in FIG. 5A) between sets of scribed lines was 5 mm. The discrete points plotted in FIG. 6B indicate the resistance of the sets of scribed lines (i.e., $r_n$ as described above) to the flow of electrons in the x direction per centimeter of width of the substrate (i.e., the resistance if the substrate were 1 cm wide, W=1 cm). The resistance per centimeter of width of the set of scribed lines in the x direction varied from approximately 0 Ohm-cm to approximately 200 Ohm-cm. The values plotted in FIG. 6B are the resistances per centimeter of width of the layer, and therefore need to be divided by 130 to give the absolute $r_n$ values (in Ohms) for the 130 cm wide substrates in this example.

In some embodiments, the magnitude of the cell potential impacting the switching speed of the device can be varied by varying the scribe dimensions (i.e., the length of the collinear segments 304, the period 305, the valve width 306, the offset 308 between segments in adjacent scribed lines, or the period offset 309) along the length of the sets of scribed lines in the y-direction and/or x-direction in the top electrically conductive layer, or the bottom electrically conductive layer, or both the top and bottom electrically conductive layer.

Electrochromic Devices with Patterned Electrically Conductive Layers and Minimized Visual Patterns In some embodiments, scribed line segments are used to create a gradient transparent conductive layer in an EC window, and the scribed line segments and/or the surrounding materials are configured to minimize the visual patterns on the window (e.g., rainbow colored streaks) due to diffraction effects. Several example embodiments will now be described.

In a first embodiment, scribed line segments are used to create a gradient transparent electrically conductive layer in an EC device, and the scribed line segments are curved or approximate curves. In some examples of the first embodiment, the scribed line segments are made up of a plurality of line sub-segments that are curved or approximate curves. In some examples of the first embodiment, the scribed line segments are made up of a plurality of contiguous straight line sub-segments with angles between the sub-segments such that the scribed line segments are approximated by curves. In this first embodiment, these so-called "curved" scribed line segments (i.e., line segments composed of sub-segments that are curved, or sub-segments that are straight and approximate a curve) are used to form the gradient transparent conductive layer pattern, as described above. When the scribed lines are "curved", the diffracted light from the scribed lines is distributed over many different angles rather than being concentrated in a single direction. In contrast, for the case of straight scribed lines, the diffracted light is concentrated in a direction perpendicular to the scribed lines. The result is that the diffracted light from curved scribed line segments is greatly reduced (e.g., is reduced by more than 10×, or more than 50×, or more than 100×, or more than 1000×) in any given direction, compared to windows using scribed transparent electrically conductive layers with straight lines.

Figure 7A:
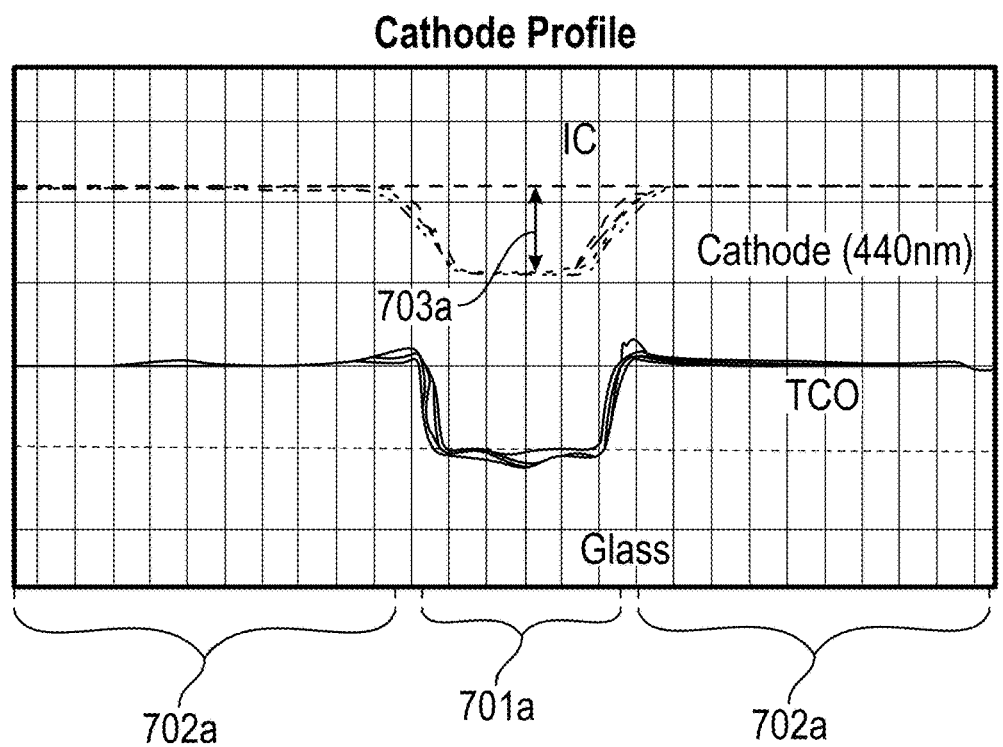
FIGS. 7A and 7B show examples of cross-sections of partial electrochromic stacks containing scribed line segments, in accordance with some embodiments.
Figure 7B:
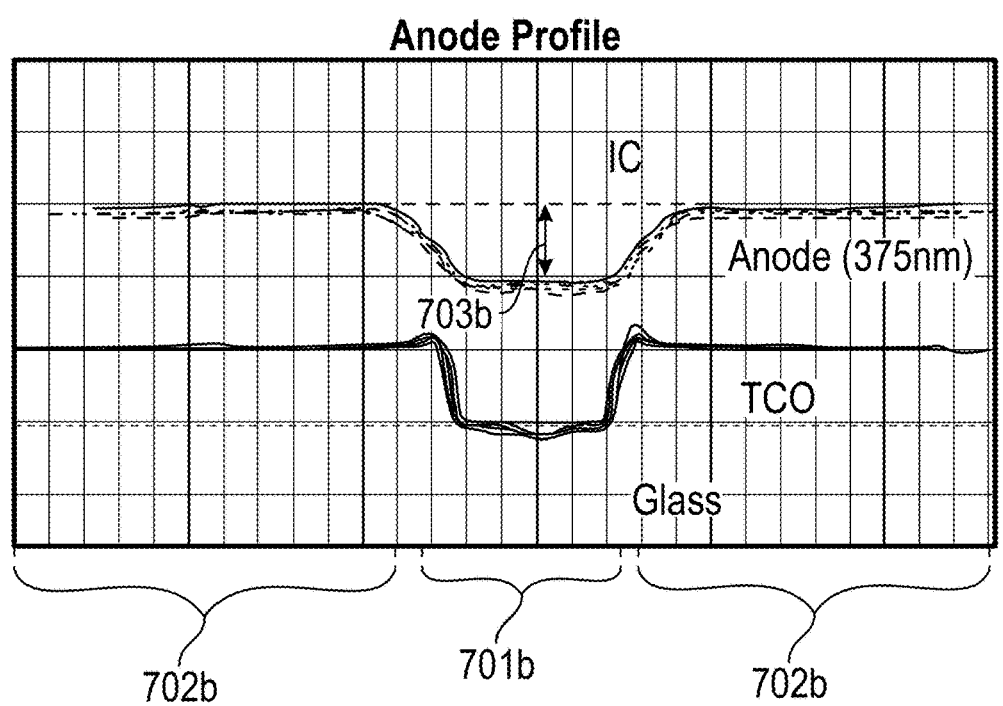

In a second embodiment, an EC device has a transparent electrically conductive layer material (e.g., a transparent conductive oxide (TCO) material) that is scribed with line segments to create a gradient transparent electrically conductive layer (e.g., a gradient TCO, or gTCO). The transparent electrically conductive layer material has an index of refraction more similar to the surrounding layers in the electrochromic stack (e.g., in a stack similar to that shown in FIG. 2). FIGS. 7A and 7B show examples of cross-sections of partial electrochromic stacks containing scribed line segments. In the case where the gradient electrically transparent conductive layer has a different index of refraction compared to the surrounding layers, the phase change of the light travelling through the window in places where there is no gradient transparent conductive layer (i.e., in the region containing the scribes 701a-b) compared to the light travelling through the window in places where there is gradient transparent electrically conductive layer (i.e., in the regions adjacent to the scribes 702a-b) will be relatively large. In this second embodiment, the gradient transparent electrically conductive layer has an index of refraction more similar to the surrounding layers, which causes less phase change (or, ideally no phase change) and the visual diffraction effects are reduced. For example, a TCO or another material can be chosen for the transparent electrically conductive layer that has an index of refraction more similar to the surrounding layers. The surrounding layers may be an anode material, a cathode material, or an ion conductor (IC) material.

In a third embodiment, scribed line segments are used to create a gradient transparent electrically conductive layer in an EC device, and the anode, cathode and/or IC layers have an index of refraction more similar to the gradient transparent electrically conductive layer. Similar to the above explanation for the second embodiment, the phase difference between light incident on a scribe and light incident adjacent to a scribe is determined by the index of refraction of the layers in the EC device stack and the thickness of those layers. In this third embodiment, the anode, cathode and/or IC layers have an index of refraction more similar to the gradient transparent electrically conductive layer (e.g., a TCO material such as indium tin oxide), which causes less phase change (or, ideally no phase change) and the visual diffraction effects are reduced.

In a fourth embodiment, scribed line segments are used to create a gradient transparent electrically conductive layer in an EC device, and the layer thicknesses for the different layers (e.g. anode, cathode, and ion conductor) in the EC stack (e.g., as shown in FIG. 2) are tuned such that the diffraction effect is reduced. Similar to the above explanation for the second and third embodiments, the phase change of the light causes the diffraction, and the phase change is determined by the index of refraction of the layers in the EC device stack and the thicknesses of those layers. By changing the thickness of one or more of the layers, it is possible to change the intensity of the diffracted light at different wavelengths. For example, the thickness of each of the layers could be changed to push the diffracted light into wavelengths outside of the visible spectrum (e.g., into the infrared). In some cases, this method is effective for reducing the intensity of the diffracted light in specific wavelength ranges only, and the intensity in other wavelength ranges is not reduced or is only partially reduced. In some examples of this fourth embodiment, the intensity of the diffracted light at different wavelengths is further minimized by engineering the wavelength dependent index of refraction of the different materials in the EC device stack.

In a fifth embodiment, scribed line segments are used to create a gradient transparent electrically conductive layer in an EC device, and the scribed line segments have depth profiles that are rounded or tapered, rather than straight walled. In some embodiments, the scribed line segments have relatively straight walls, such as those shown in FIGS. 7A and 7B. In this fifth embodiment, the scribed line segments have tapered or rounded depth profiles (e.g., approximately trapezoidal, or approximately semi-circular) rather than rectangular depth profiles. When the depth profile of the scribed lines is abrupt, such as for the scribes shown in FIGS. 7A and 7B, there is strong interference due to the phase difference between light incident on a scribe (e.g., 701a-b) and light incident adjacent to a scribe (e.g., 702a-b). However, if the depth profile of the scribe is more gradual (e.g., rounded or tapered), then the light will experience a range of phase changes depending on the depth of the scribed material. This will cause less interference and the diffracted light intensity will be reduced.

In a sixth embodiment, scribed line segments are used to create a gradient transparent electrically conductive layer in an EC device, and the anode and/or cathode materials that coat the scribed line segments are minimally conformal. FIGS. 7A and 7B show examples of a cathode and an anode that conformally coat the scribed line segments. In the layers shown in these figures, the upper surface of the cathode and the anode (i.e., which will be adjacent to the IC, after the IC is deposited) exhibits depressions, with depth shown by double arrows 703a-b. The depressions are approximately the same dimensions as the scribed line segments below the anode and cathode. In this sixth embodiment, the anode and/or cathode layers coated on the scribed gradient transparent conductive layer coat the scribed line less conformally, and anode and/or cathode layers also have similar index of refraction to the TCO material. In some embodiments, the index of refraction of the transparent electrically conductive layer, electrode (i.e., the anode or the cathode), and/or the IC layer are similar to one another, or are tuned to minimize the intensity of the diffracted light. In this embodiment, the anode and/or cathode have less of a depression 703a-b, which will have the effect of reducing the intensity of the diffracted light. The anode and cathode are typically thicker than the gradient transparent electrically conductive layer, and therefore can fill in the scribes and create a relatively smooth surface (i.e., a relatively uniform total stack thickness, with a small or zero depth depression 703a-b). In this sixth embodiment, the thickness difference and/or index of refraction difference between the scribed regions (701a-b) and non-scribed regions (702a-b) is reduced, and the intensity of the diffracted light will be reduced.

In a seventh embodiment, scribed line segments are used to create a gradient transparent electrically conductive layer in an EC device, and an electrically insulating material with an index of refraction similar to the transparent electrically conductive layer material is used to back-fill the scribed regions of the transparent electrically conductive layer. In this seventh embodiment, this back-filled electrically insulating material would preserve the resistance gradient created by the scribed gradient transparent electrically conductive layer and would prevent the scribed regions from interacting with light. The diffraction effects described above will therefore be reduced.

Electrochromic Devices with Patterned Electrically Conductive Layers with Curved Scribed Line Segments FIGS. 8A and 8B show embodiments of curved scribed line segments 800a hat are used to create a gradient transparent electrically conductive layers in EC devices. In some embodiments, the curved scribed line segments 800a are made up of line sub-segments 801. The curved scribed line segments 800a have a longitudinal direction axis line 802 and a transverse direction 803. The longitudinal direction line axis 802 lies along the propagating direction of the curved scribed line segments 800a, and the transverse direction 803 is perpendicular to the longitudinal direction line axis 802. In some embodiments, the longitudinal direction axis line 802 is approximately parallel with one or more isoresistance lines (or perpendicular to one or more resistance gradient lines) characterizing the varying resistance of an electrically conductive layer. For example, the longitudinal direction line axis 802 can be oriented approximately in the y-direction, as shown in FIG. 4A. In some embodiments, the distance from each curved scribed line segment 800a to the longitudinal direction line axis varies nonmonotonically as a function of position along the curved scribed line segment. In other words, the distance from each curved scribed line segment to the longitudinal direction line axis varies in such a way that the distance decreases and increases as a function of position along the scribed line segment. For example, the distance from the curved scribed line segment 800a in FIG. 8A to the longitudinal direction line axis 802 alternatingly increases and then decreases as a function of position along the scribed line segment 800a.

One way to describe a "curved" scribed line segment, is that the distance from the scribed line segment to the longitudinal direction line axis 802 of the curved scribed line segment 800a varies non-linearly as a function of position along the curved scribed line segment. Referring to FIG. 8A, the distance from line sub-segment 806 to the longitudinal direction line axis 802 is illustrated using a series of double-ended arrows 807. Similarly, the distance from line sub-segment 808 to the longitudinal direction axis line 802 is illustrated using a series of double-ended arrows 809. In the example shown in FIG. 8A, the inflection points 804 of line sub-segments 801 are located on the longitudinal direction line axis 802. Therefore, in one example, the distance from the line sub-segment 806 to the longitudinal direction line axis 802 is zero at the inflection points 804, and gets larger towards the center point of the sub-segment 806. In other words, the distance from the line sub-segment 806 to the longitudinal direction line axis line 802 varies nonmonotonically. In other embodiments, the distance from the longitudinal direction line axis to a line sub-segment may not be zero at the endpoints.

In some embodiments, the curved scribed line segments 800a contain inflection points 804, shown as open circles in FIGS. 8A and 8B (e.g., 804 and 814), which are points where the curvature (or approximated curvature) changes sign (i.e., from positive curvature to negative curvature, or vice versa). In some embodiments, the curved scribed line segment 800a is made up of sub-segments 801, wherein the line sub-segments are bounded by inflection points (e.g., 804 and 814). In some embodiments, the inflection points 804 all lie along a straight line, as shown in FIG. 8A. In another embodiment, the inflection points 814 do not lie along a straight line. In this embodiment the position of the inflection points 814 vary in the longitudinal and/or transverse directions, as shown in FIG. 8B. In some embodiments, the inflection points 804 all have equal spacing 805, as shown in FIG. 8A. In other embodiments, the inflection points do not have equal spacing (as shown by 815a and 815b), or are randomly spaced, as shown in FIG. 8B.

In some embodiments, the curved scribed line segment 800a is made up of line sub-segments that are regular or irregular. The line sub-segments 801 shown in FIG. 8A are examples of regular line sub-segments 801 because they repeat in a regular pattern, compared to the line sub-segments 801 in FIG. 8B (e.g., 811a and 811b) that are irregular since they do not repeat (e.g., the line sub-segments such as 815b and 815b are different lengths). FIGS. 8A and 8B are only two examples of curved scribed line segments 800a and many other shapes can be used (e.g., a plurality of short straight lines that approximate curves, curves with varying radius of curvature, etc.)

In some embodiments, the widths (e.g., shown by dimension 810 in FIG. 8A) of the scribed line segments comprising the sub-segments are constant, or are varied. Not to be limited by theory, both narrower scribed lines, and scribed lines widths that vary from sub-segment to sub-segment (either within a scribe line segment and/or between different line segments) can lead to lower maximum diffracted intensities.

In some embodiments, the line segments and/or sub-segments change slope near inflection points in an abrupt manner (or more abruptly than gradually). Gradual changes in slope near the inflection points can increase the diffracted light along particular angles. For example, sinusoidal curves can be described as having gradual changes in slope near the inflection points, which results a stronger diffracted peak intensity in a direction perpendicular to the nearly parallel sections of the sinusoidal line segments near the inflection points. However, it should be noted that sinusoidal curved line segments would still enable an improvement over straight line segments, and in some cases, therefore, can be used. In some embodiments, the radii of curvature of the curved line sub-segments near the inflection points change more abruptly than they do in sinusoidal line segments.

Figure 8C:
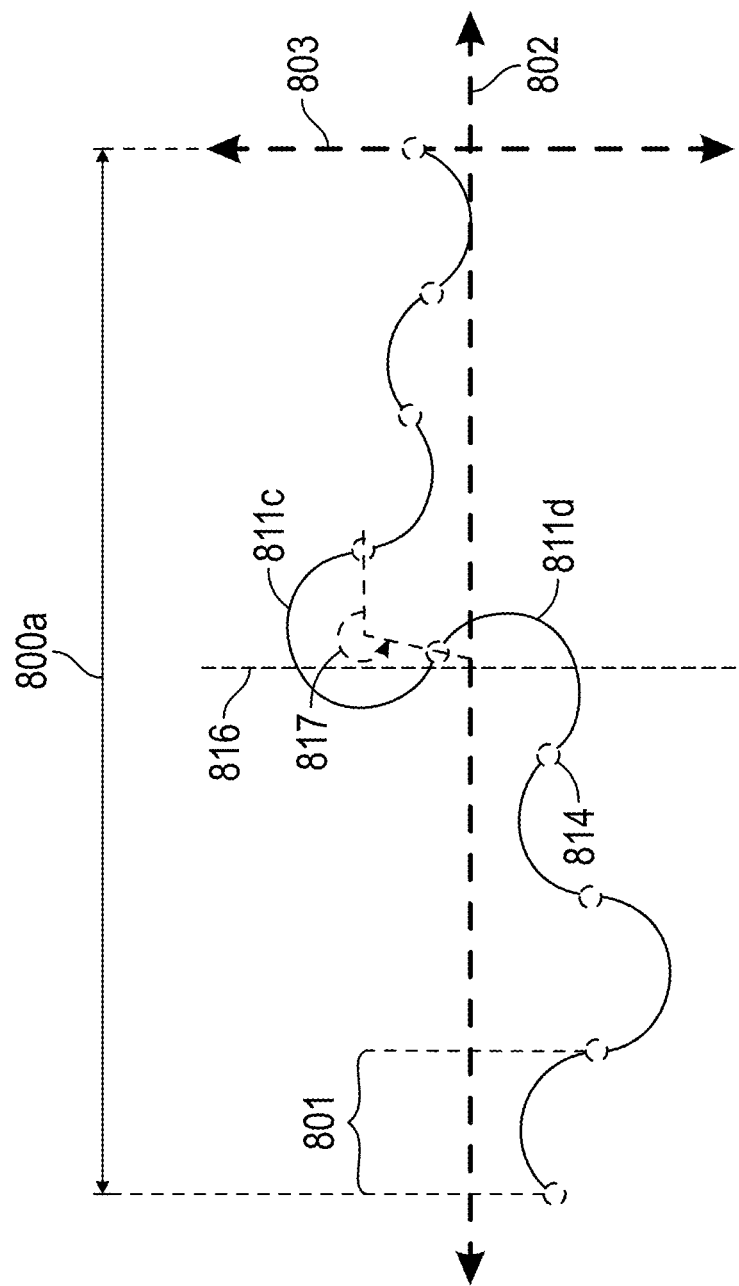
FIG. 8C is a schematic of a curved scribed line segment with irregular sub-segments that doubles back on itself and is used to create gradient transparent conducting layers in EC devices, in accordance with some embodiments.

In some cases, the curved scribed line segments double back on themselves. FIG. 8C shows an example of a curved scribed line segment that doubles back on itself. FIGS. 8A and 8B show curved line segments that extend along the longitudinal direction and do not double back on themselves. In these curves that do not double back on themselves, there exists only one instance of the curved line in the transverse direction for each location along the longitudinal direction. In other embodiments, the curved line segments double back on themselves such that in some locations along the longitudinal direction, there exist more than instance of the curved line in the transverse direction 803. In the example shown in FIG. 8C, at the location where the curve is doubled back on itself (e.g., indicated by the dashed line 816 oriented in the transverse direction) there are 3 instances of the curve in the transverse direction 803. In some such embodiments, the sub-segments comprising the curved scribed line segments include more than 180 degrees of arc (i.e., doubles back on itself). In the example shown in FIG. 8C, sub-segment 811c has more than 180 degrees of arc (as shown by angle measurement 817). In some cases, doubling back can reduce the maximum diffracted intensity (e.g., by reducing the amount of nearly parallel lines near the inflection points, as described above).

In some embodiments, irregular curved scribed line segments have one or more of the following attributes: 1) semi-circular curved scribed line segments with non-uniform radii (e.g., random, defined by one or more functions, etc.), 2) inflection points for the curved scribed line segments that do not lie in a straight line (e.g., that randomly vary by some amount from a line oriented in the longitudinal direction, that follow one or more functions, etc.), 3) curved scribed line segments that are not made up of semi-circular sub-segments (e.g., that are defined by short linear segments, curves with abruptly or gradually changing radii, etc.), and 4) curved scribed line segments following a continuous or piecewise continuous non-linear function (e.g., randomized connected polynomial functions, randomized sinusoidal functions, etc.).

In some embodiments, the curved scribed line segments contain semi-circular sub-segments with radius of curvature from 1 mm to 10 cm, or from 1 mm to 100 cm, or from 100 microns to 100 cm. In some embodiments, the curved scribed line segments contain contiguous straight line sub-segments with lengths from 100 microns to 10 mm, or from 10 microns to 10 mm, or from 10 micron to 1 mm, and angles between the contiguous straight line sub-segments from 100 degrees to 170 degrees, or less than 180 degrees, or with any angle from 0 to 180 degrees.

Figure 9:
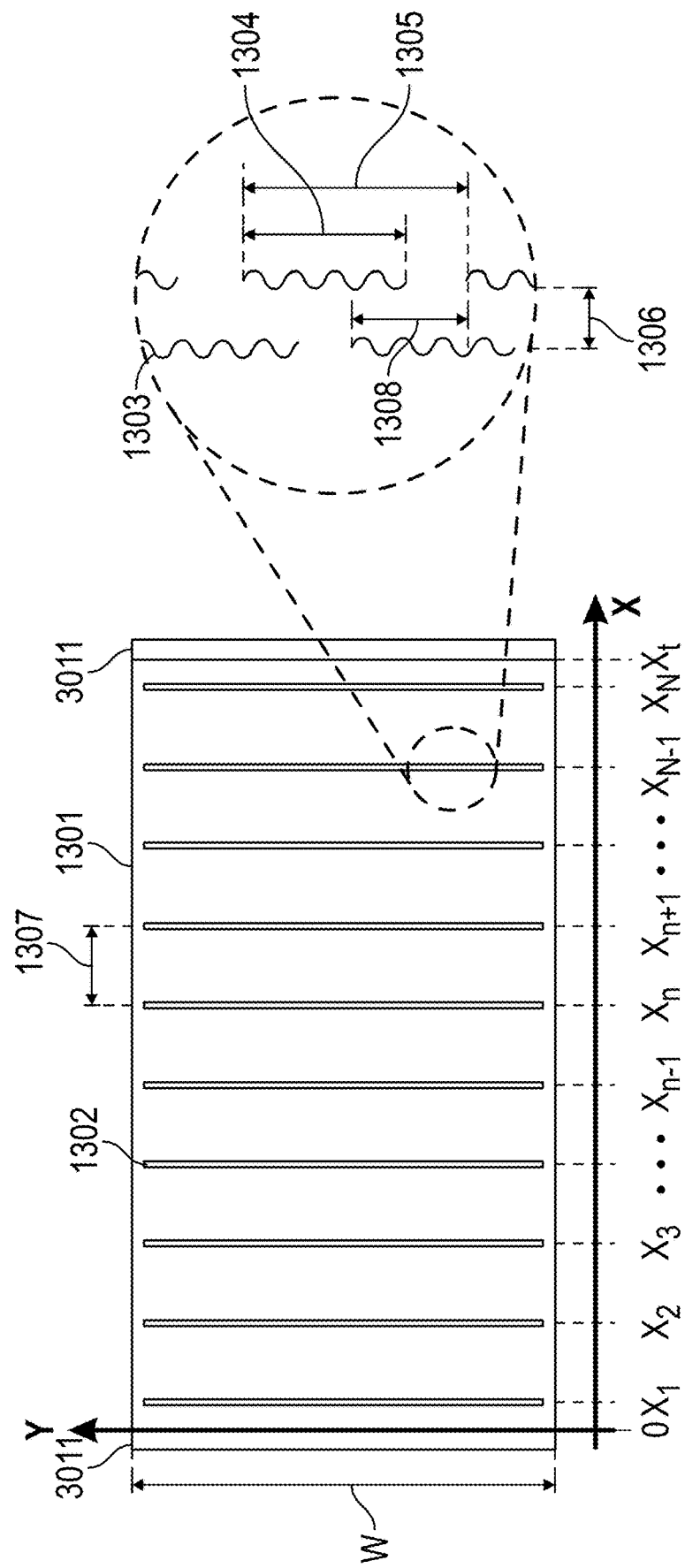
FIG. 9 is a schematic of a patterned electrically conductive layer with a transparent conducting material with a number of sets of curved scribed lines, which are patterned into the transparent conducting material, in accordance with some embodiments.

FIG. 9 shows a patterned electrically conductive layer 1301 with a transparent conducting material with a number of sets of curved scribed line segments 1302, which are patterned into the transparent electrically conducting material, similar to the layers shown in FIGS. 5A and 5B. Similar to the description above, the dimensions of the geometrical parameters of the patterns are chosen to create the required resistance profiles according to the aforementioned relationships in order to improve the uniformity of the potential between the transparent electrically conductive layers of the electrochromic stack (i.e., the local cell potential).

In the example shown in FIG. 9, each set of scribed line segments 1302 contains a plurality of smaller curved line segments 1303, which are gaps in the electrically conductive layer. The length of the curved segments in the longitudinal direction 1304, the period 1305, the valve width in the transverse direction 1306 and the offset between segments in adjacent scribed lines 1308 determines the resistance to the flow of electrons traversing a set of scribed lines in the x direction. FIG. 9 shows that there are N sets of scribed line segments 1302 in the electrically conductive layer. The bus bar 3011 in this example is either at x=0 (i.e., on one electrically conductive layer, such as 27 in FIG. 1, and 2003 in FIG. 4A), or at $x=x_t$ (i.e., on the opposing electrically conductive layer (i.e., 26 in FIG. 1, and 2004 in FIG. 4A). In general, the x-positions of the sets of scribed line segment are described as $[x_1, x_2, x_3, \ldots x_{n-1}, x_n, x_{n+1}, \ldots, x_{N-1}, x_N]$.

Figure 10:
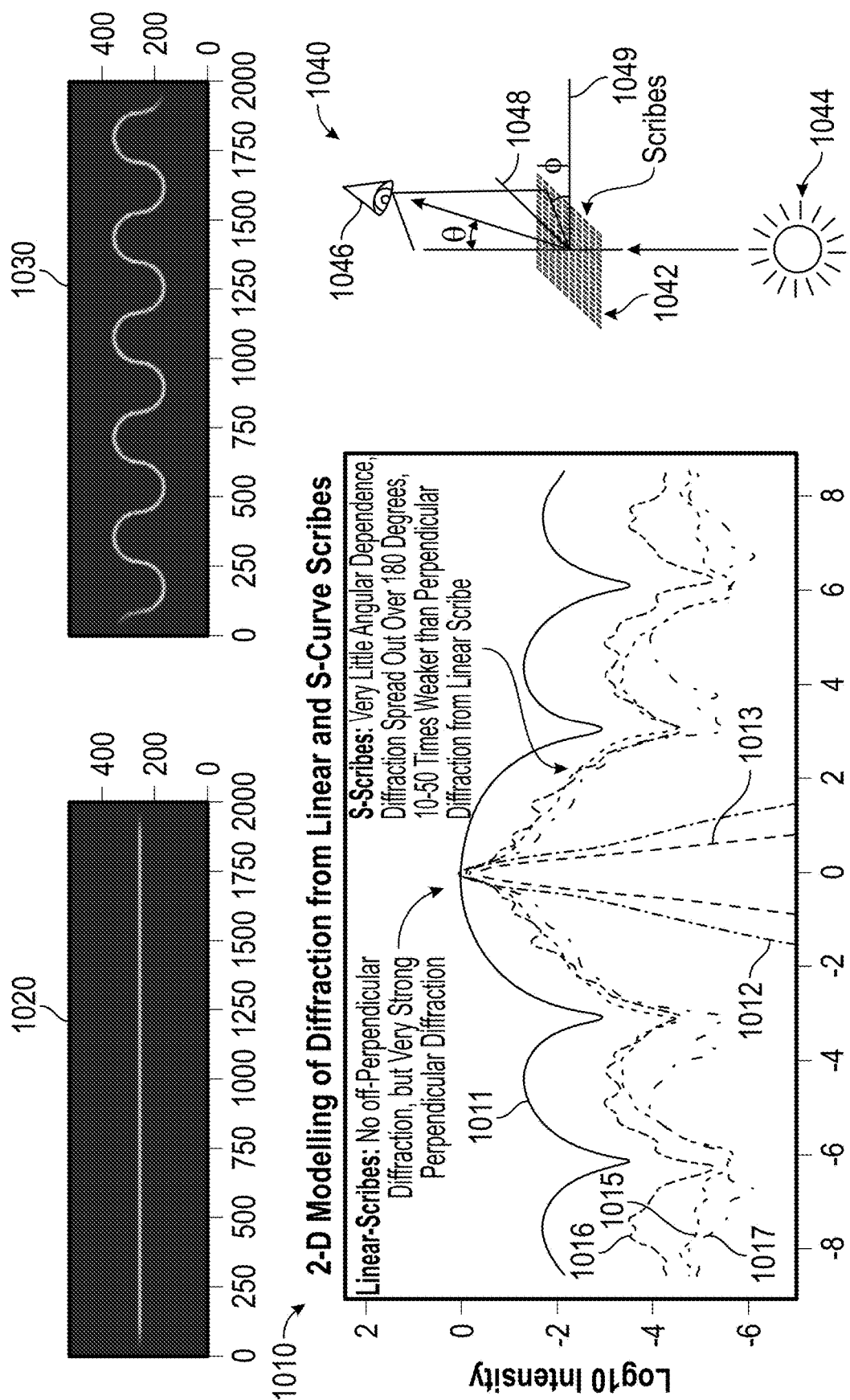
FIG. 10 shows modeling results illustrating that the curved scribe line segments have lower intensity diffracted peaks under certain conditions, compared to the intensity of the diffracted peaks from the linear scribes, in accordance with some embodiments. The inset on the right hand side of FIG. 10 shows the geometry of the modelled structure.

FIG. 10 shows modeling results 1010 illustrating that a transparent electrically conductive layer with sets of scribed lines (e.g., as shown in FIG. 9) containing the curved scribe line segments 1030 have lower intensity diffracted peaks (as shown in 1011, 1012 and 1013) at all angles, compared to the perpendicular diffracted peak from a transparent electrically conductive layer with sets of scribed lines (e.g., as shown in FIG. 5A) containing the linear scribes 1020 (as shown in 1015, 1016 and 1017). The x-axis on graph 1010 is the angle θ and the y-axis is the intensity of diffracted light in a logarithmic scale. The inset 1040 on the right hand side of FIG. 10 shows the geometry of the structure being modeled. The illumination source 1044 is normal to the patterned transparent electrically conductive layer 1042. The angle θ is the angle between a line normal to the patterned transparent electrically conductive layer 1042 and the observer 1046. The angle 4) shown in inset 1040 is the projected angle between the observer 1046 and a transverse direction 1049 perpendicular to the longitudinal direction 1048 of the scribed line segments on the transparent patterned electrically conductive layer 1042.

The modeled data plotted in graph 1010 correspond to different angles of φ (0°, 30° and 90°). 1011, 1012 and 1013 show the modeled intensity of diffracted light at different angles for the straight scribes shown in 1020, at φ angles of 0°, 30° and 90°, respectively. 1015, 1016 and 1017 show the modeled intensity of diffracted light at different angles for the curved scribes shown in 1030, at φ angles of 0°, 30° and 90°, respectively. The diffracted light for the straight scribes at φ=0° is shown in curve 1011, which has the highest intensity for the data plotted at all angles of θ. In other words, the intensity of diffracted light normal to the scribe longitudinal direction (i.e., at φ=0°) is higher for the straight scribes 1020 than those of the curved scribes 1030 in any directions of θ or φ (except at θ=0°, because at that angle the intensity is dominated by the transmitted light rather than the diffracted light). The curves 1012 and 1013 show that the diffracted light for the straight scribes at angles of φ=30° and 90° (i.e., in a direction between the longitudinal and transverse directions, or in the transverse direction) are the lowest. These modeling results confirm what is experimentally observed for EC devices containing straight scribes— the diffracted intensity is very strong in a direction perpendicular to the scribed line segments (i.e., at φ=0°) and weak in other angles. For example, referring back to FIGS. 1A and 1B, windows with straight scribed line segments display intense streaks in a direction perpendicular to the scribed line segments.

The modeled intensity of diffracted light for the curved scribes shown in 1015, 1016 and 1017 in graph 1010 are lower at every angle θ compared to the data plotted in 1011 (i.e., for the straight scribes at φ=0°). In other words, the diffracted light from the straight scribes is more focused in a certain direction (i.e., φ=0°), while the diffracted light from the curved scribes is more diffuse in angle (i.e., spread out over a range of angles φ=0° to 90°). Note that the y-axis in graph 1010 is logarithmic, and therefore the diffracted intensity at $\phi=0°$ and $\theta=4°$, for example, is about 1000 times lower for the curved scribes than for the straight scribes. One benefit of the curved scribes compared to the straight scribes is that the maximum diffracted intensity (across all angles) is reduced. The diffracted light will be more difficult for an observer to detect, since the intensity is lower. In other words, the curved scribes enable a more uniform angular distribution of the diffracted light compared to the straight scribes. The maximum intensities of the diffracted peaks are lower in a more uniform distribution, and therefore the diffracted light is more difficult for humans (i.e., a typical observer) to sense.

FIGS. 11A and 11B show modeled diffracted intensities from two different types of sets of curved scribed line segments. Image 1110 shows a set of regular curved scribed line segments (i.e., Naive S-Curve), where the scribed line segments are arranged in a regular repeating pattern. In this example of regular curved scribed line segments, the line segments (and groups of sub-segments) are the same size and shape, and the inflection points lie along straight lines (i.e., along the longitudinal directions for each line segment). Image 1120 shows a set of irregular curved scribed line segments (i.e., Disordered S-Curve), where the scribed line segments are random and do not repeat within a curved line segment or between curved line segments. In this example of irregular curved scribed line segments, the line segments (and groups of sub-segments) are different sizes and shapes, and the inflection points do not lie along straight lines.

Image 1112 shows the 2-dimensional diffracted intensity from the regular curved scribed line segments (i.e., Naive S-Curve Diffraction). Image 1122 shows the 2-dimensional diffracted intensity from the irregular curved scribed line segments (i.e., Disordered S-Curve). In images 1110, 1120, 1112 and 1122 the x-axis is one physical direction on the transparent electrically conductive layer, and the y-axis is a perpendicular direction on the transparent electrically conductive layer. The images 1112 and 1122 show that the regular curved scribes have higher intensity diffracted light at particular angles, while the irregular curved scribes spread out (or smear) the diffracted intensity more uniformly over a range of angles. One benefit, therefore, of irregular scribes is that the diffracted light distribution is more uniform, and the diffracted light will be more difficult for an observer to detect, since the maximum diffracted intensity (across all angles) is reduced.

Figure 12A:
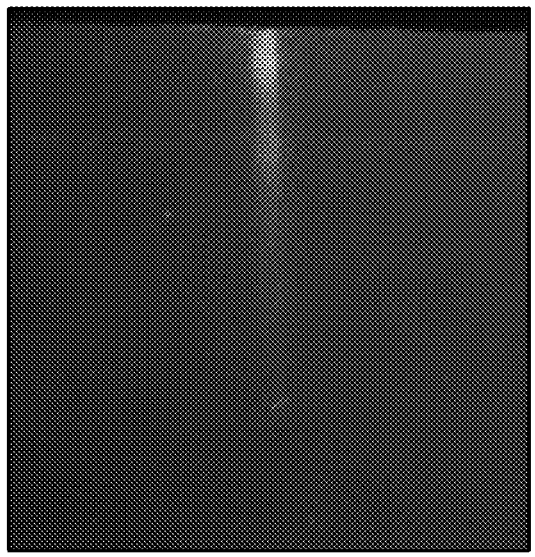
FIG. 12A is an experimental photograph of diffracted light from scribed electrically conductive layers with straight scribed line segments on 6"×6" glass substrates, in accordance with some embodiments. The light source is located above and behind the sample.
Figure 12B:
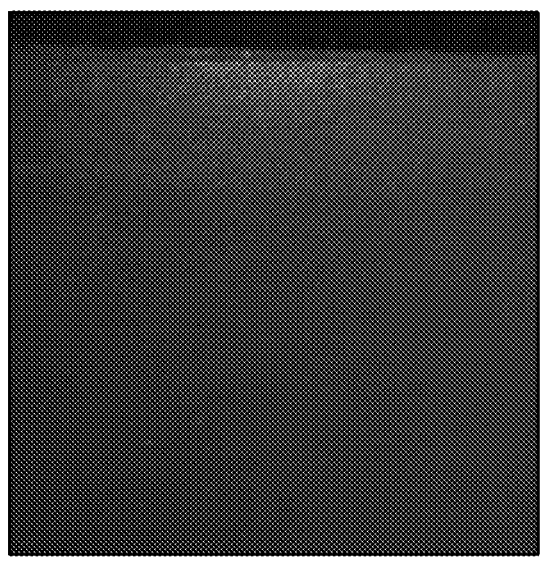
FIG. 12B is an experimental photograph of diffracted light from scribed electrically conductive layers with curved scribed line segments on 6"×6" glass substrates, in accordance with some embodiments. The light source is located above and behind the sample.

FIGS. 12A and 12B show experimental photographs of diffracted light from scribed transparent electrically conductive layers on 6"×6" glass substrates. The light source for both images is located above and behind the samples. FIG. 12A shows the diffracted light from a transparent electrically conductive layer with straight scribed line segments, and FIG. 12B shows the diffracted light from the transparent electrically conductive layer with curved scribed line segments. The diffracted light from the straight scribes (shown in FIG. 12A) was focused at a particular angle (i.e., perpendicular to the scribed lines, at $\phi\sim0°$, while the diffracted light from the curved scribes (shown in FIG. 12B) was distributed across a wider range of angles. Due to the distribution of the diffracted light intensity, the maximum intensity of the diffracted light was lower for the curved scribes compared to the straight scribes. Furthermore, to the observer (i.e., the camera) the diffracted light appears to extend farther across the sample in the case of the straight scribes compared to that of the curved scribes.

Figure 13A:
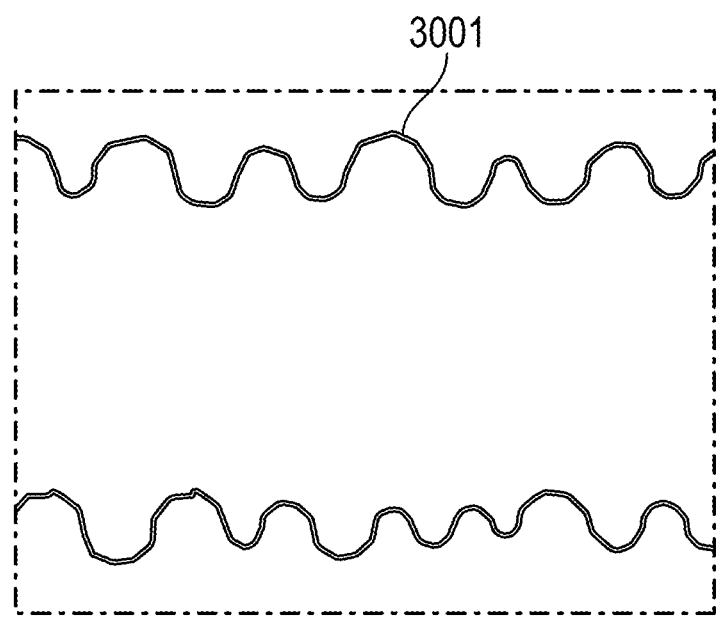
FIGS. 13A and 13B show examples of microscope images of curved scribed line segments that were made up of straight line sub-segments, in accordance with some embodiments.
Figure 13B:
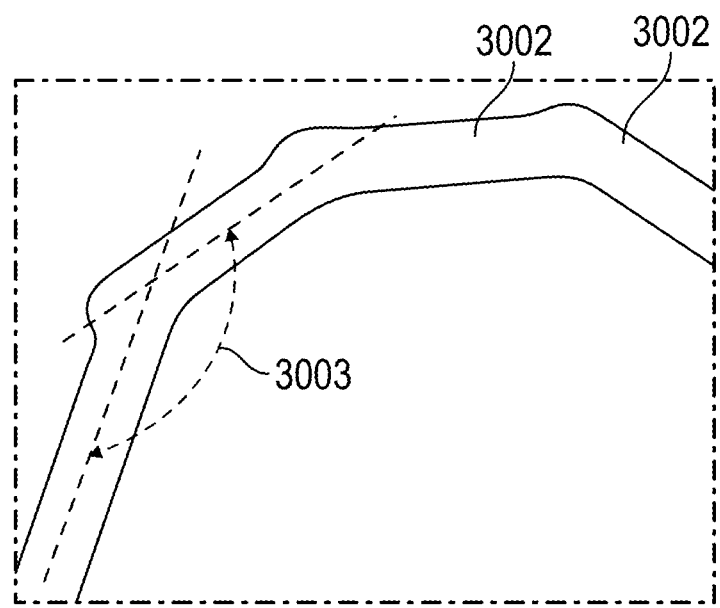

FIGS. 13A and 13B show examples of microscope images of curved scribed line segments that were made up of straight line sub-segments. For example, FIG. 13A shows an irregular curved scribed line segment 3001. FIG. 13B is a zoomed in image showing that the curved line segment 3001 was made up of contiguous straight line sub-segments 3002. The contiguous straight line sub-segments 3002 had angles between them 3003. The lengths of the sub-segments 3002 and the angles between sub-segments 3003 were varied to create the curved line segment 3001.

In practice, devices and windows with scribed transparent electrically conductive layers with different regular and irregular patterns containing curved scribed line segments have been fabricated and tested. Experiments with different laser ablation scanning rates (e.g., from 250 mm/s to 3000 mm/s) have also been performed. The experimentally measured diffraction intensities from these experimental samples agreed well with the modeled data (e.g., shown in FIG. 10). In one experiment, the diffracted intensity was reduced by from 10× to 50× for angles perpendicular to the main axis (i.e., the macroscopic scribe direction, or the longitudinal direction, or at $\phi\sim0°$).

Values of Resistance Gradients for Patterned Transparent Electrically Conductive Layers with Curved Scribed Line Segments In some embodiments, the resistance contribution of the patterned features (e.g., regular and irregular curved scribed line segments) varies along the length of the substrate non-linearly. The resistance contribution from the patterned features per unit width of the device can be from about 0 to about 30 Ohm-cm, or from about 0 to about 300 Ohm-cm, or from about 0 to about 500 Ohm-cm, or from about 0 to about 750 Ohm-cm, or from about 0 to about 1000 Ohm-cm, or from about 0 to about 3000 Ohm-cm, or from about 0 to about 10000 Ohm-cm. In other words, for a substrate width of 100 cm, then the resistance contribution from the patterned features (e.g., $r_n$) would be from about 0 to about 0.3 Ohm, or from about 0 to about 3 Ohm, or from about 0 to about 5 Ohm, or from about 0 to about 7.5 Ohm, or from about 0 to about 10 Ohm, or from about 0 to about 30 Ohm, or from about 0 to about 100 Ohm.

The resistance contribution from the transparent electrically conductive material per unit width of the device can be from about 0 to about 100 Ohm-cm, or from about 0 to about 300 Ohm-cm, or from about 0 to about 600 Ohm-cm, or from about 0 to about 1200 Ohm-cm, or from about 0 to about 1500 Ohm-cm, or from about 0 to about 1800 Ohm-cm, or from about 0 to about 2400 Ohm-cm, or from about 0 to about 3600 Ohm-cm, or from about 0 to about 4800 Ohm-cm, or from about 0 to about 12000 Ohm-cm. The resistance contribution per unit width from the transparent electrically conductive material is driven by the distance to the bus bar, the thickness of the material and the sheet resistance of the material.

The dimensions of the patterned features drive the resistance contribution of the patterned lines. The length of the scribe line segments in the longitudinal direction (e.g., 1304 in FIG. 9) can be from about 0.01 mm to about 100 mm, or from about 0.01 mm to about 20 mm, or from about 0.01 mm to about 10 mm, or from about 0.1 mm to about 100 mm, or from about 0.1 mm to about 20 mm, or from about 0.1 mm to about 10 mm, or from about 1 mm to about 10 mm, or from about 1 mm to about 20 mm, or from about 1 mm to about 100 mm, or from about 5 mm to about 10 mm, or from about 5 mm to about 15 mm, or from about 5 mm to about 20 mm, or from about 5 mm to about 25 mm, or from about 5 mm to about 30 mm. The period between scribed line segments in the longitudinal direction (e.g. 1305 in FIG. 9) can be from about 2 mm to about 10 mm, or from about 2 mm to about 20 mm, or from about 2 mm to about 100 mm, or from about 5 mm to about 10 mm, or from about 5 mm to about 15 mm, or from about 5 mm to about 20 mm, or from about 5 mm to about 25 mm, or from about 5 mm to about 30 mm. The gap between scribed line segments in the longitudinal direction (e.g. the difference between 1305 and 1304 in FIG. 9) can be about 0.5 mm, or from about 0.01 to about 100 mm, or from about 0.01 to about 50 mm, or from about 0.01 to about 20 mm, or from about 0.01 to about 10 mm, or from about 0.01 to about 5 mm, or from about 0.01 to about 1 mm, or from about 0.01 to about 0.5 mm, or from about 0.1 to about 100 mm, or from about 0.5 to about 200 mm, or from about 0.1 to about 50 mm, or from about 0.1 to about 20 mm, or from about 0.1 to about 10 mm, or from about 0.1 to about 5 mm, or from about 0.1 to about 1 mm, or from about 0.1 to about 0.5 mm, or from about 0.2 to about 0.8 mm, or from about 0.4 to about 0.6 mm. The valve width (e.g., 1306 in the transverse direction in FIG. 9) can be from about 10 to about 1000 microns, or from about 10 to about 500 microns, or from about 10 to about 200 microns, or from about 50 to about 500 microns, or from about 50 to about 400 microns, or from about 50 to about 300 microns.

In some embodiments, the effective sheet resistance profile on one or both electrically conductive layers varies approximately from 1 Ohms/square to 10000 Ohms/square, or from 1 Ohms/square to 5000 Ohms/square, or from 10 Ohms/square to 10000 Ohms/square, or from 10 Ohms/square to 5000 Ohms/square, or from 1 Ohms/square to 1000 Ohms/square, or from 10 Ohms/square to 1000 Ohms/square.

Given a substantially rectangular transparent electrically conductive layer with a transparent conducting material of constant thickness and constant resistivity (and no patterning), the resistance between the bus bar and a line parallel to the bus bar is $r_{linear}(x)$ (where the bus bar is at x=0, and the parallel line is at a position x). $r_{linear}(x)$ increases linearly as x increases. Given a patterned electrically conductive layer of the geometry shown in FIG. 9, composed of a transparent conducting material of constant thickness and constant resistivity, and a pattern of sets of curved scribed lines, the resistance between the bus bar and a line parallel to the bus bar is $r_{pattern}(x)$ (where the bus bar is at x=0, and the parallel line is at a position x). $r_{pattern}(x)$ will equal $r_{linear}(x)$ with approximately step-wise increases in resistance (equal to $r_n$ as described above) at approximately the x-positions of the sets of scribed lines ($x_n$ as described above). FIG. 14 illustrates examples of $r_{linear}(x)$ and $r_{pattern}(x)$ vs. position x for the simple rectangular geometry described. An example of r(x), the resistance between the bus bar and a line parallel to the bus bar in the transparent electrically conductive layer, calculated from a smoothly varying sheet resistance (e.g., R(x)) is also shown in FIG. 14 for reference. In some cases $r_{pattern}(x)$ will be similar to r(x) near the position of a set of scribed lines, or in between sets of scribed lines, depending on the intervals chosen for evaluating $r_n$. In some cases $r_{pattern}(x)$ at a given x position will always be higher or always be lower than r(x), depending on the intervals chosen for evaluating $r_n$.

The patterns are implemented to change the resistance profiles within the transparent electrically conductive layers. $\Delta r_{p-l}(x)$ is the difference between the patterned electrically conductive layer resistance profile $r_{pattern}(x)$ and the linear uniform transparent conducting material resistance profile $r_{linear}(x)$. Another way to compare the resistance of a uniform and a patterned transparent electrically conductive layer is by a ratio. The ratio of $\varphi(x)=r_{pattern}(x)/r_{linear}(x)$ will in general be a number equal to or greater than 1 for all values of x. In some cases the difference in resistance $\Delta r_{p-l}(x)$ will increase as the distance from the bus bar increases, and the ratio of the resistances $\varphi(x)=r_{pattern}(x)/r_{linear}(X)$ will increase as the distance from the bus bar increases.

FIG. 14 shows an example of $r_{linear}(x)$ for a transparent electrically conductive layer with a uniform transparent conducting material, and $r_{pattern}(x)$ for a patterned transparent electrically conductive layer with a uniform transparent conducting material and a pattern. FIG. 14 also shows the resistance r(x), resulting from a smoothly varying sheet resistance (as described above). The upper schematic in FIG. 14 shows the patterned electrically conductive layer 3501 geometry for this example. The bus bar 3511 on the electrically conductive layer is at x=0, and the substrate is 1.3 m long and 0.8 m wide. The distance between the patterned features 3507 (e.g., the pitch between sets of scribed lines) is 0.1 m. The pattern in this example is chosen to approximate a hyperbolic increase in sheet resistance as the distance from the bus bar increases (e.g., wherein the scribe segment lengths in the sets of scribed lines close to x=0 are different than the scribe segment lengths in the sets of scribed lines close to x=$x_t$). Due to the discrete nature of the pattern, $r_{pattern}(x)$ has approximately step-wise increases in resistance due to the resistance from each pattern feature $r_n$. The difference between the patterned transparent electrically conductive layer resistance $r_{pattern}(x)$ and the linear uniform transparent electrically conducting material resistance $r_{linear}(X)$ at a particular value of x=x*, is shown in FIG. 14 as $\Delta r_{p-l}(x^*)$. Due to the approximately hyperbolic $r_n$ resistances in this example, $\Delta r_{p-l}(x)$ increases with increasing distance from the bus bar. Due to the nature of the $r_n$ resistances in this example, the ratio $\varphi(x)=r_{pattern}(X)/r_{linear}(x)$ will also increase with increasing distance from the bus bar.

As shown in FIG. 14, $r_{pattern}(x)$ is an approximation of r(x). In some embodiments, a shorter pitch will decrease the difference between $r_{pattern}(x)$ and r(x). However as previously noted the resistance profile need not perfectly adhere to the R'(x)=R(x)*($x_t$/x-1) relationship to enable improved switching uniformity compared to devices with transparent electrically conductive layers with constant sheet resistances. A discrete pattern (e.g., sets of scribed lines) is readily manufacturable, for instance using a scanning laser to ablate the electrically conductive material. The high speed and low cost of such a process are also benefits for high volume manufacturing. The patterns created by scanning laser ablation processes are also easy to modify for different sized devices, and the added flexibility is a benefit for the manufacturing of electrochromic windows and mirrors, which typically are manufactured in many different sizes. In some cases, the pitch can be chosen to be large to reduce the number of scribed lines and increase manufacturability. In some cases, the pitch is adjusted to provide an acceptable difference between $r_{pattern}$ and r(x) with minimal number of scribes required during manufacturing.

In some embodiments, the average ratio of $r_{pattern}(x)/r_{linear}(x)$ in the first and/or the second transparent electrically conductive layer is at least about 1.1, or at least about 1.25, or at least about 1.5, or at least about 2, or at least about 3, or at least about 5, or at least about 10, or at least about 50, or at least about 100, or at least about 300, or from about 1.1 to about 1.25, or from about 1.1 to about 2, or from about 1.1 to about 3, or from about 1.1 to about 5, or from about 1.1 to about 10, or from about 1.1 to about 20, or from about 1.1 to about 30, or from about 1.1 to about 50, or from about 1.1 to about 100, or from about 1.1 to about 300.

In some embodiments, the average $\Delta r_{p-l}(x)$ in the first and/or second transparent electrically conductive layer per unit width of the device is at least 0.1 Ohm-m, or at least 0.3 Ohm-m, or at least 1 Ohm-m, or at least 3 Ohm-m, or at least 10 Ohm-m, or at least 30 Ohm-m, or at least about 100 Ohm-m, or from about 0.1 to about 0.3 Ohm-m, or from about 0.1 to about 1 Ohm-m, or from about 0.1 to about 3 Ohm-m, or from about 0.1 to about 10 Ohm-m, or from about 0.1 to about 30 Ohm-m, or from about 0.1 to about 100 Ohm-m. In some embodiments, $\Delta r_{p-l}(x)$ in the first and/or second transparent electrically conductive layer generally increases as the distance from the bus bar increases. In some embodiments, $\Delta r_{p-l}(x)$ in the first and/or second transparent electrically conductive layer increases hyperbolically as the distance from the bus bar increases.

In some embodiments, the average $r_n$ in the first and/or second transparent electrically conductive layer per unit width of the device is at least 0.1 Ohm-m, or at least 0.3 Ohm-m, or at least 1 Ohm-m, or at least 3 Ohm-m, or at least 10 Ohm-m, or at least 30 Ohm-m, or at least about 100 Ohm-m, or from about 0.1 to about 0.3 Ohm-m, or from about 0.1 to about 1 Ohm-m, or from about 0.1 to about 3 Ohm-m, or from about 0.1 to about 10 Ohm-m, or from about 0.1 to about 30 Ohm-m, or from about 0.1 to about 100 Ohm-m.

Figure 15:
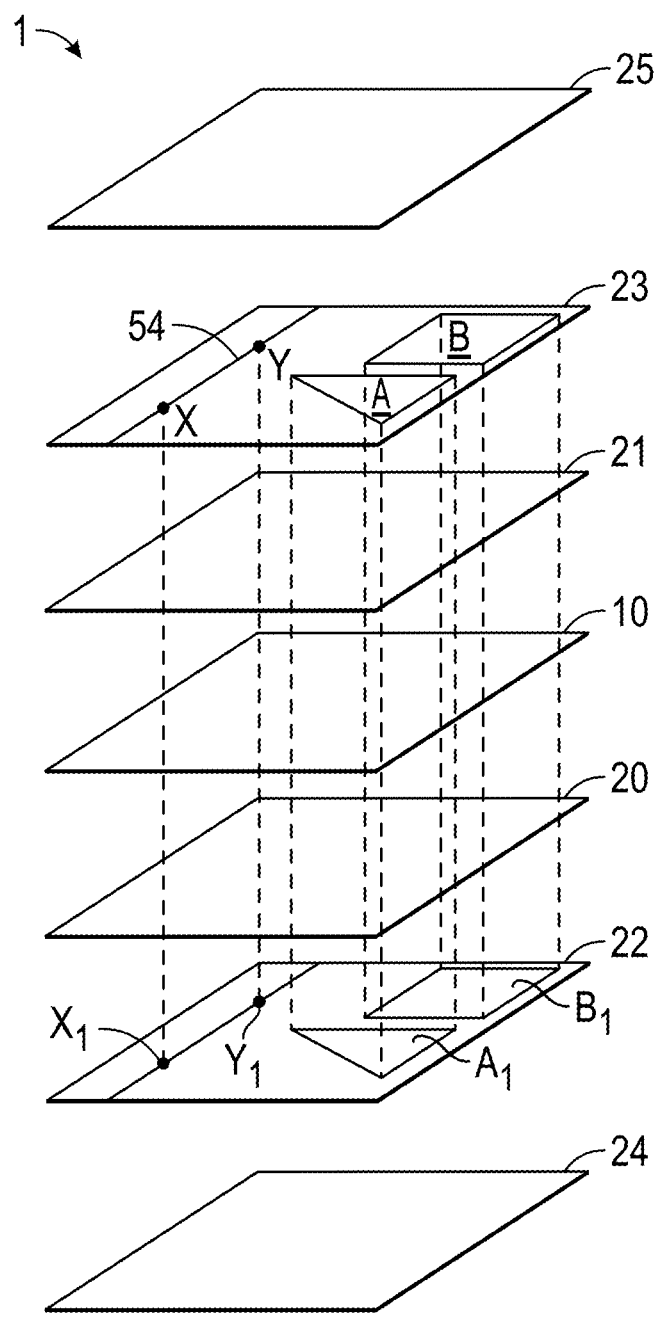
FIG. 15 is an exploded view of the multi-layer device of FIG. 2, in accordance with some embodiments.

FIG. 15 shows an exploded view of an EC multilayer stack (as shown in FIG. 2), with gradient transparent electrically conductive layers 22 and 23. In one embodiment, with the electrochromic device geometry of FIG. 15, the non-linearity in the $\Delta r_{p-l}(x)$ of the first and/or second transparent electrically conductive layer may be observed by comparing the ratio of the average $\Delta r_{p-l}(x)$ in two different regions of the first and/or second electrically conductive layer, wherein the first and second regions are each mutually exclusive regions of a single line oriented in the x-direction (e.g., line 54), and each region comprises at least 25% of the x-dimensional length of the first and/or second electrically conductive layer. For example, in one such embodiment, the ratio of the average $\Delta r_{p-l}(x)$ in a first region of the first and/or second electrically conductive layer, $\Delta r^{avg1}_{p-l}$ to the average $\Delta r_{p-l}(x)$ in a second region of the first and/or second electrically conductive layer, $\Delta r^{avg2}_{p-l}$, is at least 0.1 Ohm-m, or at least 0.3 Ohm-m, or at least 1 Ohm-m, or at least 3 Ohm-m, or at least 10 Ohm-m, or at least 30 Ohm-m, or at least about 100 Ohm-m, or from about 0.1 to about 0.3 Ohm-m, or from about 0.1 to about 1 Ohm-m, or from about 0.1 to about 3 Ohm-m, or from about 0.1 to about 10 Ohm-m, or from about 0.1 to about 30 Ohm-m, or from about 0.1 to about 100 Ohm-m, wherein the first and second region are each mutually exclusive regions of a single line oriented in the x-direction, and each region comprises at least 25% of the x-dimensional length of the first and/or second transparent electrically conductive layer.

In one embodiment, the non-linearity in the resistance of the first and/or second transparent electrically conductive layer may be observed by comparing the average ratio $\varphi(x)=r_{pattern}(x)/r_{linear}(x)$ in two mutually exclusive regions of the first and/or second electrically conductive layer wherein the first and second regions are each circumscribed by a convex polygon and each comprises at least 25% of the surface area of the electrically conductive layer. For example, in one such embodiment, the average $\varphi(x)$ in a first region of the first and/or second electrically conductive layer, $\varphi^{avg1}(x)$, to the average $\varphi(x)$ in a second region of the first and/or second electrically conductive layer, $\varphi^{avg2}(x)$, is at least 0.1 Ohm-m, or at least 0.3 Ohm-m, or at least 1 Ohm-m, or at least 3 Ohm-m, or at least 10 Ohm-m, or at least 30 Ohm-m, or at least about 100 Ohm-m, or from about 0.1 to about 0.3 Ohm-m, or from about 0.1 to about 1 Ohm-m, or from about 0.1 to about 3 Ohm-m, or from about 0.1 to about 10 Ohm-m, or from about 0.1 to about 30 Ohm-m, or from about 0.1 to about 100 Ohm-m, wherein each of the first and second regions is circumscribed by a mutually exclusive convex polygon, and each comprises at least 25% of the surface area of the electrically conductive layer. This may be illustrated by reference to FIG. 15. First transparent electrically conductive layer 22 comprises convex polygon $A_1$ and convex polygon $B_1$ and each circumscribes a mutually exclusive region comprising at least 25% of the surface area of the transparent electrically conductive layer 22; in one embodiment, the ratio of the average in a first region of the first transparent electrically conductive layer bounded by convex polygon $A_1$, $\varphi^{avg1}(x)$, to the average in a second region of the first transparent electrically conductive layer bounded by convex polygon $B_1$, $\varphi^{avg2}(x)$, is at least 0.1 Ohm-m, or at least 0.3 Ohm-m, or at least 1 Ohm-m, or at least 3 Ohm-m, or at least 10 Ohm-m, or at least 30 Ohm-m, or at least about 100 Ohm-m, or from about 0.1 to about 0.3 Ohm-m, or from about 0.1 to about 1 Ohm-m, or from about 0.1 to about 3 Ohm-m, or from about 0.1 to about 10 Ohm-m, or from about 0.1 to about 30 Ohm-m, or from about 0.1 to about 100 Ohm-m. As illustrated, convex polygon $A_1$ is a triangle and convex polygon $B_1$ is a square merely for purposes of exemplification; in practice, the first region may be bounded by any convex polygon and the second region may be bounded by any convex polygon.

In one embodiment, the non-linearity in the resistance of the first and/or second transparent electrically conductive layer may be observed by comparing the average $\Delta r_{p-l}(x)$ in two mutually exclusive regions of the first and/or second transparent electrically conductive layer wherein the first and second regions are each circumscribed by a convex polygon and each comprises at least 25% of the surface area of the transparent electrically conductive layer. For example, in one such embodiment, the average $\Delta r_{p-l}(x)$ in a first region of the first and/or second transparent electrically conductive layer, $\Delta r^{avg1}_{p-l}$ to the average $\Delta r_{p-l}(x)$ in a second region of the first and/or second transparent electrically conductive layer, $\Delta r^{avg2}_{p-l}$, is at least 0.1 Ohm-m, or at least 0.3 Ohm-m, or at least 1 Ohm-m, or at least 3 Ohm-m, or at least 10 Ohm-m, or at least 30 Ohm-m, or at least about 100 Ohm-m, or from about 0.1 to about 0.3 Ohm-m, or from about 0.1 to about 1 Ohm-m, or from about 0.1 to about 3 Ohm-m, or from about 0.1 to about 10 Ohm-m, or from about 0.1 to about 30 Ohm-m, or from about 0.1 to about 100 Ohm-m, wherein each of the first and second regions is circumscribed by a mutually exclusive convex polygon, and each comprises at least 25% of the surface area of the transparent electrically conductive layer. This may be illustrated by reference to FIG. 15. First transparent electrically conductive layer 22 comprises convex polygon $A_1$ and convex polygon $B_1$ and each circumscribes a mutually exclusive region comprising at least 25% of the surface area of the transparent electrically conductive layer 22; in one embodiment, the ratio of the average in a first region of the first transparent electrically conductive layer bounded by convex polygon $A_1$, $\Delta r^{avg1}_{p-l}(x)$, to the average in a second region of the first transparent electrically conductive layer bounded by convex polygon $B_1$, $\Delta r^{avg2}_{p-l}(x)$, is at least 0.1 Ohm-m, or at least 0.3 Ohm-m, or at least 1 Ohm-m, or at least 3 Ohm-m, or at least 10 Ohm-m, or at least 30 Ohm-m, or at least about 100 Ohm-m, or from about 0.1 to about 0.3 Ohm-m, or from about 0.1 to about 1 Ohm-m, or from about 0.1 to about 3 Ohm-m, or from about 0.1 to about 10 Ohm-m, or from about 0.1 to about 30 Ohm-m, or from about 0.1 to about 100 Ohm-m. As illustrated, convex polygon $A_1$ is a triangle and convex polygon $B_1$ is a square merely for purposes of exemplification; in practice, the first region may be bounded by any convex polygon and the second region may be bounded by any convex polygon.

In one embodiment, the non-linearity in the resistance of the first and/or second transparent electrically conductive layer may be observed by comparing the average $r_n$ in two mutually exclusive regions of the first and/or second transparent electrically conductive layer wherein the first and second regions are each circumscribed by a convex polygon and each comprises at least 25% of the surface area of the transparent electrically conductive layer. For example, in one such embodiment, the average $r_n$ in a first region of the first and/or second transparent electrically conductive layer, $r^{avg1}{}_n$, to the average $r_n$ in a second region of the first and/or second electrically conductive layer, $r^{avg2}{}_n$, is at least 0.1 Ohm-m, or at least 0.3 Ohm-m, or at least 1 Ohm-m, or at least 3 Ohm-m, or at least 10 Ohm-m, or at least 30 Ohm-m, or at least about 100 Ohm-m, or from about 0.1 to about 0.3 Ohm-m, or from about 0.1 to about 1 Ohm-m, or from about 0.1 to about 3 Ohm-m, or from about 0.1 to about 10 Ohm-m, or from about 0.1 to about 30 Ohm-m, or from about 0.1 to about 100 Ohm-m, wherein each of the first and second regions is circumscribed by a mutually exclusive convex polygon, and each comprises at least 25% of the surface area of the transparent electrically conductive layer. This may be illustrated by reference to FIG. 15. First transparent electrically conductive layer 22 comprises convex polygon $A_1$ and convex polygon $B_1$ and each circumscribes a mutually exclusive region comprising at least 25% of the surface area of the transparent electrically conductive layer 22; in one embodiment, the ratio of the average in a first region of the first transparent electrically conductive layer bounded by convex polygon $A_1$, $r^{avg1}{}_n$, to the average in a second region of the first transparent electrically conductive layer bounded by convex polygon $B_1$, $r^{avg2}{}_n$, is at least 0.1 Ohm-m, or at least 0.3 Ohm-m, or at least 1 Ohm-m, or at least 3 Ohm-m, or at least 10 Ohm-m, or at least 30 Ohm-m, or at least about 100 Ohm-m, or from about 0.1 to about 0.3 Ohm-m, or from about 0.1 to about 1 Ohm-m, or from about 0.1 to about 3 Ohm-m, or from about 0.1 to about 10 Ohm-m, or from about 0.1 to about 30 Ohm-m, or from about 0.1 to about 100 Ohm-m. As illustrated, convex polygon $A_1$ is a triangle and convex polygon $B_1$ is a square merely for purposes of exemplification; in practice, the first region may be bounded by any convex polygon and the second region may be bounded by any convex polygon.

Referring again to FIG. 15, the spatial non-uniformity and non-linearity of the resistance of the first and second transparent electrically conductive layers may be correlated in accordance with one aspect of the present invention. For example, line segment $X_1$-$Y_1$ in first transparent electrically conductive layer 22 may be projected through second electrode layer 21, ion conductor layer 10 and first electrode layer 20 and onto second transparent electrically conductive layer 23, with the projection defining line segment X-Y. In general, if the resistance between the bus bar and a location along line segment $X_1$-$Y_1$ is non-linear and generally increases in first electrically conductive layer 22 (i.e., the resistance generally increases non-linearly moving along the resistance gradient curve in the direction from point $X_1$ to point $Y_1$), the resistance between the bus bar and a location along segment X-Y generally decreases in second transparent electrically conductive layer 23 (i.e., the resistance generally decreases non-linearly along the resistance gradient curve 54 in the direction from point X to point Y). Line segments X-Y and $X_1$-$Y_1$ can have a minimum length of at least 1 cm, or in the case of a rectangular substrate the line segments can be at least 25% of the total length or width of the substrate. For example, line segments X-Y and $X_1$-$Y_1$ may have a length of 2.5 cm, 5 cm, 10 cm, or 25 cm. Additionally, line segments X-Y and $X_1$-$Y_1$ may be straight or curved. In one embodiment, for example, the resistance gradients in transparent electrically conductive layers 22, 23 are non-zero constants and are of opposite sign (e.g., the resistance generally increases non-linearly in first electrically conductive layer along in the direction from point $X_1$ to point $Y_1$ and generally decreases non-linearly along sheet resistance gradient curve 54 in the direction from point X to point Y). By way of further example, in one embodiment, substrates 24, 25 are rectangular and the resistance gradients in transparent electrically conductive layers 22, 23 are non-zero constants and are of opposite sign (e.g., the sheet resistance generally increases non-linearly in second transparent electrically conductive layer 23 along gradient 54 in the direction from point X to point Y and generally decreases non-linearly in first transparent electrically conductive layer 22 along the line containing line segment $X_1$-$Y_1$ in the direction from point $X_1$ to point $Y_1$).

Figure 16:
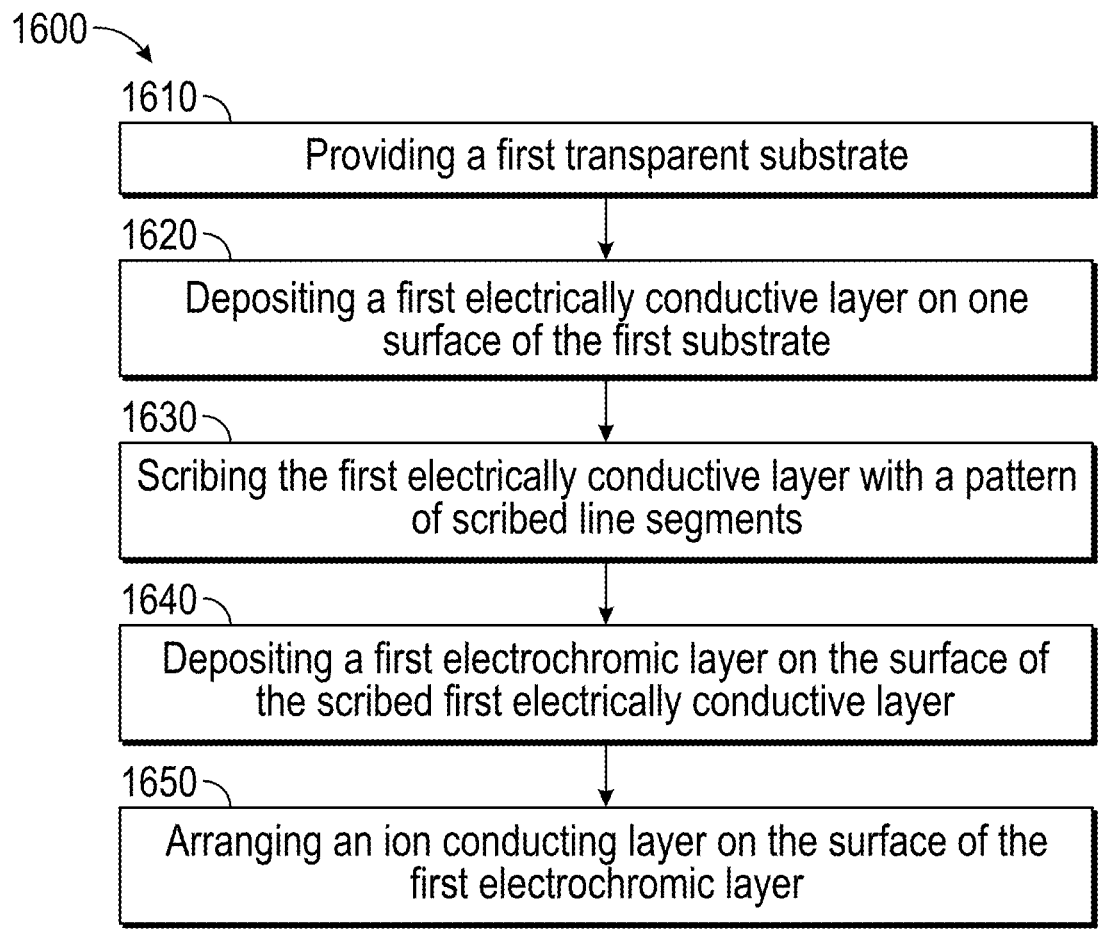
FIG. 16 is a flowchart for producing electrochromic devices with patterned electrically conductive layers with scribed line segments, in accordance with some embodiments.

Methods of Producing Electrochromic Devices with Patterned Transparent Electrically Conductive Layers with Curved Scribed Line Segments FIG. 16 is a flowchart of a method 1600 for producing electrochromic devices with patterned transparent electrically conductive layers with curved scribed line segments. In some embodiments, method 1600 comprises step 1610, providing a first transparent substrate. A first transparent electrically conductive layer can then be deposited on one surface of the first substrate in step 1620. In some embodiments, step 1630 is scribing the first transparent electrically conductive layer with a pattern of scribed line segments (e.g., using laser scribing, photolithography, or other patterning technique). In other embodiments, steps 1620 and 1630 can be replaced with a single step of depositing a first transparent electrically conductive layer through a shadow mask to produce a first electrically conductive layer with a pattern of "scribed" line segments. In that case, the "scribed" line segments would be gaps in the transparent electrically conductive layer formed via the shadow mask deposition process.

Continuing with method 1600, the next step 1640 comprises depositing a first electrochromic layer on the surface of the scribed first transparent electrically conductive layer, and step 1650 comprises arranging an ion conducting layer on the surface of the first electrochromic layer.

In some embodiments of method 1600, the scribed line segments are curved, as described above (e.g., the distance from each scribed line segment to a line along the longitudinal direction of each scribed line segment varies non-monotonically or nonlinearly as a function of position along the scribed line segment). The embodiments of the curved scribed line segments, patterns, multilayer stacks and devices described above can be used in conjunction with method 1600.

What is claimed is:

1. An electrochromic device, comprising:
a first transparent substrate;
a first transparent electrically conductive layer on a surface of the first transparent substrate, wherein the first transparent electrically conductive layer is patterned with a first plurality of scribed line segments comprising a longitudinal direction line axis, a transverse direction, and a plurality of scribed line sub-segments;
a first electrochromic layer on a surface of the first transparent electrically conductive layer; and
an ion conducting layer on a surface of the first electrochromic layer;
wherein the distance from each of the scribed line sub-segments in the first plurality of the scribed line segments to the longitudinal direction line axis varies nonmonotonically in the transverse direction as a function of position along the longitudinal direction line axis.

2. The electrochromic device of claim 1, wherein each of the scribed line sub-segments in the first plurality of scribed line segments have a radius of curvature from 1 mm to 10 cm.

3. The electrochromic device of claim 1, wherein each of the scribed line sub-segments in the first plurality of scribed line segments comprise a plurality of contiguous straight lines comprising lengths from 10 microns to 10 mm and wherein an angle between each of the contiguous straight lines comprises 100 degrees to 170 degrees.

4. The electrochromic device of claim 1, wherein the first plurality of line segments comprise regular scribed line sub-segments.

5. The electrochromic device of claim 1, wherein the first plurality of scribed line segments comprise irregular scribed line sub-segments.

6. The electrochromic device of claim 1, wherein the first plurality of scribed line segments further comprise a plurality of inflection points that lie on the longitudinal direction line axis.

7. The electrochromic device of claim 1, wherein the first plurality of scribed line segments further comprise a plurality of inflection points that do not lie on the longitudinal direction line axis.

8. The electrochromic device of claim 1, further comprising:
a second electrochromic layer arranged on a surface of the ion conducting layer;
a second transparent electrically conductive layer arranged on a surface of the second electrochromic layer, wherein the second transparent electrically conductive layer is patterned with a second plurality of scribed line segments;
a first bus bar in contact with the first transparent electrically conductive layer; and
a second bus bar in contact with the second transparent electrically conductive layer, and wherein the longitudinal direction lines of the first plurality of scribed line segments are substantially parallel to the first bus bar and wherein the longitudinal direction lines of the second plurality of scribed line segments are substantially parallel to the second bus bar.

9. The electrochromic device of claim 8, wherein a longitudinal length of the first and the second scribed line segments are from about 0.01 mm to about 100 mm.

10. A method of forming an electrochromic device, comprising:
providing a first transparent substrate;
depositing a first transparent electrically conductive layer on a surface of the first substrate;
patterning the first transparent electrically conductive layer with a first plurality of scribed line segments to form a scribed first transparent electrically conductive layer comprising a scribed surface;
depositing a first electrochromic layer on the scribed surface of the scribed first transparent electrically conductive layer; and
depositing an ion conducting layer on a surface of the first electrochromic layer, wherein; the first plurality of scribed line segments comprise a longitudinal direction line axis, a transverse direction, and a plurality of scribed line sub-segments; and
the distance from each of the scribed line sub-segments in the first plurality of scribed line segments to the longitudinal direction line axis varies nonmonotonically in the transverse direction as a function of position along the longitudinal direction line axis.

11. The method of claim 10 wherein patterning the first transparent electrically conductive layer with the first plurality of scribed line segments comprises laser scribing.

12. The method of claim 10, wherein patterning each of the line sub-segments in the first plurality of line segments comprises patterning a radius of curvature from 1 mm to 10 cm.

13. The method of claim 10, wherein patterning the first plurality of line segments comprises patterning a plurality of contiguous straight line sub-segments with lengths from 10 microns to 10 mm and with angle between each of the contiguous straight line sub-segments in the plurality of straight line subsegments of 100 degrees to 170 degrees.

14. The method of claim 10, wherein patterning the first plurality of scribed line segments comprises patterning regular scribed line sub-segments.

15. The method of claim 10, wherein patterning the first plurality of scribed line segments comprises patterning irregular scribed line sub-segments.

16. The method of claim 10, wherein the first plurality of scribed line segments comprise inflection points that lie along a straight line.

17. The method of claim 10, wherein the first plurality of scribed line segments comprise inflection points that do not lie along a straight line.

18. The method of claim 10, further comprising:
depositing a second transparent electrically conductive layer on a surface of a second transparent substrate;
patterning the second transparent electrically conductive layer with a second plurality of scribed line segments to form a scribed second transparent electrically conductive layer comprising a scribed surface;
depositing a second electrochromic layer on a surface of the scribed second transparent electrically conductive layer;
arranging the second transparent substrate with the scribed second transparent electrically conductive layer and the second electrochromic layer onto the ion conducting layer such that the second electrochromic layer is adjacent to the ion conducting layer;
arranging a first bus bar in contact with the first transparent electrically conductive layer; and
arranging a second bus bar in contact with the second transparent electrically conductive layer, wherein the longitudinal direction lines of the first plurality of scribed line segments are substantially parallel to the first bus bar and wherein the longitudinal direction lines of the second plurality of scribed line segments are substantially parallel to the second bus bar.

19. The method of claim 18, wherein a length of the second plurality of scribed line segments are from about 0.01 mm to about 100 mm.

* * * * *